United States Patent
Watanabe et al.

(10) Patent No.: US 9,613,750 B2
(45) Date of Patent: Apr. 4, 2017

(54) SEGMENTED-COIL MANUFACTURING METHOD AND APPARATUS

(75) Inventors: Atsushi Watanabe, Toyota (JP); Manabu Kitamura, Miyoshi (JP); Hajime Watanabe, Toyota (JP); Shingo Hashimoto, Okazaki (JP); Takanori Oota, Anjo (JP)

(73) Assignees: TOYOTA JIDOSHA KABUSHIKI KAISHA, Toyota-Shi (JP); AISIN AW CO., LTD., Anjo-Shi (JP)

( * ) Notice: Subject to any disclaimer, the term of this patent is extended or adjusted under 35 U.S.C. 154(b) by 309 days.

(21) Appl. No.: 14/346,409

(22) PCT Filed: Sep. 27, 2011

(86) PCT No.: PCT/JP2011/071989
§ 371 (c)(1),
(2), (4) Date: Mar. 21, 2014

(87) PCT Pub. No.: WO2013/046316
PCT Pub. Date: Apr. 4, 2013

(65) Prior Publication Data
US 2014/0223727 A1  Aug. 14, 2014

(51) Int. Cl.
*H01K 3/10* (2006.01)
*H01F 41/04* (2006.01)
(Continued)

(52) U.S. Cl.
CPC ............... *H01F 41/04* (2013.01); *H02K 3/12* (2013.01); *H02K 15/0421* (2013.01); *Y10T 29/4902* (2015.01)

(58) Field of Classification Search
CPC H02K 15/0421; H02K 15/0471; H01F 41/04; Y10T 29/49002; Y10T 29/49009; Y10T 29/117; Y10T 29/53161
(Continued)

(56) References Cited

U.S. PATENT DOCUMENTS 5,619,787 A * 4/1997 Couture .................... H02K 3/12
29/596
7,825,562 B2 * 11/2010 Naganawa ........... H02K 15/063
310/184
(Continued)

FOREIGN PATENT DOCUMENTS

CN 101860140 A 10/2010
JP 51-118001 10/1976
(Continued)

*Primary Examiner* — Donghai D Nguyen
(74) *Attorney, Agent, or Firm* — Andrews Kurth Kenyon LLP

(57) ABSTRACT

In a segment coil manufacturing method for manufacturing a segmented coil by bending a flat rectangular conductor using a forming die so that the segmented coil has a circular arc section, a crank section, and a protrusion-shaped section, the forming die includes an outer peripheral surface forming upper die, an inner peripheral surface forming upper die, an inner peripheral surface forming lower die, and an outer peripheral surface forming lower die, and the method includes forming the circular arc section, the crank section, and the protrusion-shaped section while holding at least two surfaces of the outer peripheral surfaces of the flat rectangular conductor by the outer peripheral surface forming upper die, the inner peripheral surface forming upper die, the inner peripheral surface forming lower die, and the outer peripheral surface forming lower die.

16 Claims, 24 Drawing Sheets

(51) Int. Cl.
*H02K 15/04* (2006.01)
*H02K 3/12* (2006.01)

(58) Field of Classification Search
USPC .......... 29/596, 606, 825, 736, 760; 310/184,
310/208; 72/382, 383, 396, 414, 475
See application file for complete search history.

(56) References Cited

U.S. PATENT DOCUMENTS

| 8,429,947 B2* | 4/2013 | Akimoto | H02K 15/0421 |
| | | | 72/475 |
| 2010/0251796 A1 | 10/2010 | Akimoto et al. | |
| 2010/0252139 A1 | 10/2010 | Akimoto | |

FOREIGN PATENT DOCUMENTS

| JP | 2004-297863 A | 10/2004 |
| JP | 2010-263771 A | 11/2010 |

* cited by examiner

US 9,613,750 B2

SEGMENTED-COIL MANUFACTURING METHOD AND APPARATUS

CROSS-REFERENCE TO RELATED APPLICATIONS

This is a national phase application based on the PCT International Patent Application No. PCT/JP2011/071989 filed on Sep. 27, 2011, the entire contents of which are incorporated herein by reference.

TECHNICAL FIELD

The present invention relates to a method for producing a segment coil to be used in a stator of a motor or the like and particularly to a technique for accurately forming the segment coil at low cost.

BACKGROUND ART

In recent years, more and more automobiles mount drive motors in view of environmental issues. Such a drive motor to be mounted in a car is desired to provide large output power for driving a vehicle and have a small size for car installation. In particular, a hybrid electric car has to mount an engine and a drive motor together in an engine room and thus highly requires a small-sized motor. To enhance the motor power, there have been methods for increasing a cross sectional area of a coil to be used in the motor and also increasing a space factor or lamination factor of a stator. On the other hand, various approaches for reducing the size of a motor have been studied.

As one of the methods for increasing the cross sectional area of the coil of the stator, there is proposed a method for forming a coil by winding a flat rectangular conductor. In a case where the coil made of the flat rectangular conductor having a rectangular cross section is partially inserted in rectangular slots, such a coil can achieve a lower void ratio than a coil made of a conductor having a circular cross section. This can lead to an enhanced lamination factor. It is further found that a stator formed from segment coils each made of a flat rectangular conductor is advantageous to reduce iron loss, copper loss, and so on. However, when a segment coil is to be made of a flat rectangular conductor, a processing method therefor is somewhat hard. It is thus desired to simplify the processing method.

Patent Document 1 discloses a technique for a device for forming a segment to be used for a coil of a rotary electric machine, a method for forming the segment, and the segment made by the method. This device includes a pair of first forming dies for forming a crank section and a curved section of the segment, a pair of second forming dies for forming the crank section and shoulder sections, and two forming rollers for forming the shoulder section in cooperation with the second forming dies. In forming a segment from a flat rectangular conductor, the first forming dies clamp the flat rectangular conductor to form the curved section and the crank section. Then, the second forming dies clamp the flat rectangular conductor to further deform the crank section. Successively, the forming rollers press the flat rectangular conductor against the second forming dies, thereby forming the segment. In this way, the bending work can be realized in consideration of a spring back effect of the flat rectangular conductor.

RELATED ART DOCUMENTS

Patent Documents

Patent Document 1: JP-A-2004-297863

SUMMARY OF INVENTION

Problems to be Solved by the Invention

However, the technique disclosed in Patent Document 1 is conceived as problematic with the following points in forming a segment.

The technique of Patent Document 1 uses a plurality of dies to form a segment. The first forming dies, the second forming dies, and the forming rollers are driven in different directions. Accordingly, it is necessary to provide separate drive mechanisms for the first forming dies, the second forming dies, and the forming rollers. Further, this technique needs a first step of forming the curved section and the crank section in the flat rectangular conductor with the first forming dies, a second step of forming a protrusion section in the flat rectangular conductor with the second forming dies, and a third step of forming the shoulder sections in the flat rectangular conductor, and further needs a step of opening the dies between the first step and the second step. Specifically, after the first forming dies are used for the above forming and retrieved, the second forming dies are driven for the forming, in which the segment is bent by use of the forming rollers. Thus, while the first forming dies are opened, the second forming dies are disabled to move. This makes it difficult to shorten read time. Accordingly, reduction in production cost of segment coils is supposed to be difficult.

Since one stator needs to include segment coils each having a plurality of different shapes. Thus, tooling change of the dies is required, but it takes time and trouble for this tooling change of the dies. In such a case, in the technique of Patent Document 1 needing a plurality of steps and a plurality of dies, the trouble with the tooling change is conceived to largely influence the cost.

Reduced size and enhanced output power of a stator are increasingly demanded as mentioned above. In a stator using the segment coils, increasing the number of segment coils or increasing the cross sectional area of each segment coil leads to high output power of a motor. However, such a demand for a reduced size of coil ends of a stator leads to a complicated shape of each segment and further the increased number of segment coils to be used also leads to the complicated segment shape. It is therefore desired to reduce a production cost in a segment coil forming step.

The present invention has been made to solve the above problems and has a purpose to provide a method for forming a segment coil with the reduced number of steps of forming the segment coil.

Means of Solving the Problems

To achieve the above purpose, one aspect of the invention provides a method for manufacturing a shoulder section as described below.

(1) In a segment coil manufacturing method for manufacturing a segment coil by bending a flat rectangular conductor by use of a forming die, the segment coil including a circular-arc shaped section, a crank-shaped section, and a protrusion section at a coil end, the forming die includes a first forming die and a second forming die, and the method includes forming the circular-arc shaped section, the crank-shaped section, and the protrusion section while holding at least two surfaces of outer surfaces of the flat rectangular conductor by the first forming die and the second forming die.

(2) In the segment coil manufacturing method disclosed in (1), preferably the method includes holding the flat rectangular conductor by a holding mechanism between the first forming die and the second forming die in a direction intersecting with a moving direction of the first forming die while the first and second forming dies are in a die open state.

(3) In the segment coil manufacturing method disclosed in (1) or (2), preferably circular-arc shaped section forming faces to form the circular-arc shaped section and crank-shaped section forming faces to form the crank-shaped section are provided along the moving direction of the first forming die, the method includes: bending the flat rectangular conductor in a flatwise direction by the circular-arc shaped section forming faces formed in the first forming die and the second forming die to form the circular-arc shaped section, and bending a part of the circular-arc shaped section in the flatwise direction into a crank shape by the crank-shaped section forming faces formed in the first forming die and the second forming die to form the crank-shaped section, and deforming the flat rectangular conductor in an edgewise direction by protrusion section forming faces formed in the first forming die and the second forming die to form the protrusion section.

(4) In the segment coil manufacturing method disclosed in one of (1) to (3), preferably, the forming die further include a third forming die and a fourth forming die, the first forming die, the second forming die, the third forming die, and the fourth forming die are placed in positions facing each other, the method includes moving a set of the first forming die and the fourth forming die and a set of the second forming die and the third forming die in a direction coming close to each other, to form an outer periphery of the circular-arc shaped section by the circular-arc shaped section forming faces of the first forming die and the third forming die and an inner periphery of the circular-arc shaped section by the circular-arc shaped section forming faces of the second forming die and the fourth forming die, to form the crank-shaped section in the flat rectangular conductor by the crank-shaped section forming faces of the first forming die and the second forming die and the crank-shaped section forming faces of the third forming die and the fourth forming die, the crank-shaped section forming faces being provided so that centers of circular-arcs defining the crank-shaped section forming faces are different from each other; and to form an outer surface of the protrusion section by the protrusion section forming faces of the first forming die and the fourth forming die and an inner surface of the protrusion section is formed by the protrusion section forming faces of the second forming die and the third forming die.

(5) In the segment coil manufacturing method disclosed in (4), preferably the method includes forming a stepped section in the segment coil at the coil end by stepped section forming faces formed in the first forming die and the fourth forming die or in the second forming die and the third forming die by utilizing a gap provided between a set of the first forming die and the second forming die and a set of the third forming die and the fourth forming die.

(6) In the segment coil manufacturing method disclosed in one of (1) to (5), preferably, the method includes moving a shoulder forming die along a side face of the forming die to bend the flat rectangular conductor in the edgewise direction.

(7) In the segment coil manufacturing method disclosed in one of (1) to (6), preferably, after the circular-arc shaped section and the crank-shaped section are formed in the flat rectangular conductor; the method includes forming a shift section in a crank shape by bending the flat rectangular conductor in the flatwise direction by a shift section forming die while holding the flat rectangular conductor by the forming die.

To achieve the above purpose, furthermore, another aspect of the invention provides a device for manufacturing a segment coil as described below.

(8) In a segment coil manufacturing device including a forming die arranged to bend a flat rectangular conductor to form a circular-arc shaped section, a crank-shaped section, and a protrusion section in a segment coil, the forming die include a first forming die and a second forming die, and the first forming die and the second forming die have circular-arc shaped section forming faces, crank-shaped section forming faces, and protrusion section forming faces to continuously form the circular-arc shaped section, the crank-shaped section, and the protrusion section while holding at least two surfaces of outer surfaces of the flat rectangular conductor.

(9) The segment coil manufacturing device disclosed in (8) preferably further includes a holding mechanism placed between the first forming die and the second forming die and configured to hold the flat rectangular conductor in a direction intersecting with a moving direction of the first forming die while the first forming die and the second forming die are in a die open state.

(10) In the segment coil manufacturing device disclosed in (8) or (9), preferably the circular-arc shaped section forming faces are curved faces to form the circular-arc shaped section by bending the flat rectangular conductor in a flatwise direction, the crank-shaped section forming faces are curved faces to form the crank-shaped section by bending a part of the circular-arc shaped section in the flatwise direction into a crank shape, the protrusion section forming faces are curved faces to form the protrusion section by deforming the flat rectangular conductor in an edgewise direction, and the circular-arc shaped section forming faces and the crank-shaped section forming faces are provided along the moving direction of the first forming die and the edgewise direction of the flat rectangular conductor.

(11) In the segment coil manufacturing device disclosed in one of (8) to (10), preferably, the forming die further include a third forming die and a fourth forming die, the first forming die, the second forming die, the third forming die, and the fourth forming die are placed in positions facing each other, the first forming die and the fourth forming die are moved in the same direction, and the second forming die and the fourth forming die are moved in a direction to come close to the first forming die and the fourth forming die, the first forming die and the third forming die include the circular-arc shaped section forming faces to form an outer periphery of the circular-arc shaped section and the crank-shaped section forming faces to form an outer periphery of the crank-shaped section, the second forming die and the fourth forming die include the circular-arc shaped section forming faces to form an inner periphery of the circular-arc shaped section and the crank-shaped section forming faces to form an inner periphery of the crank-shaped section, the first forming die and the fourth forming die include the protrusion section forming faces to form an outer surface of the protrusion section, the second forming die and the third forming die include the protrusion section forming faces to form an inner surface of the protrusion section, and the crank-shaped section forming faces are provided in the first forming die to the fourth forming die so that the crank-shaped section forming faces of the first forming die and the second forming die and the crank-shaped section forming faces of the third forming die and the fourth forming die are different in centers of circular-arcs defining the crank-shaped section forming faces from each other.

(12) In the segment coil manufacturing device disclosed in (11), preferably, stepped section forming faces are formed in the first forming die and the fourth forming die or in the second forming die and the third forming die by utilizing a gap between a set of the first forming die and the second forming die and a set of the third forming die and the fourth forming die.

(13) The segment coil manufacturing device disclosed in one of (8) to (12) preferably further includes a shoulder forming die configured to move along a side face of the forming die and bend the flat rectangular conductor in the edgewise direction.

(14) The segment coil manufacturing device disclosed in one of (8) to (13) preferably further includes a shift-section forming die to form a shift section in a crank shape by bending the flat rectangular conductor in the flatwise direction while the flat rectangular conductor is held by the forming die.

To achieve the above purpose, still further, another aspect of the invention provides a segment coil as described below.

(15) In a segment coil including a circular-arc shaped section, a crank-shaped section, and a protrusion section at a coil end and having a rectangular cross section, the segment coil is manufactured by use of a segment coil manufacturing device according to any one of (8) to (14).

Effects of the Invention

The segment coil manufacturing method in one aspect of the invention configured as above can provide the following operations and advantageous effects.

The above configuration disclosed in (1) is a segment coil manufacturing method for manufacturing a segment coil by bending a flat rectangular conductor by use of a forming die, the segment coil including a circular-arc shaped section, a crank-shaped section, and a protrusion section at a coil end, wherein the forming die includes a first forming die and a second forming die, and the method includes forming the circular-arc shaped section, the crank-shaped section, and the protrusion section while holding at least two surfaces of outer surfaces of the flat rectangular conductor by the first forming die and the second forming die.

By using the first and second forming dies, the circular-arc shaped section, crank-shaped section, and protrusion section are formed without opening the dies while holding at least two surfaces of the outer peripheral surfaces of the flat rectangular conductor by the first and second forming dies. Accordingly, the flat rectangular conductor is continuously plastically deformed so that the circular-arc shaped section, crank-shaped section, and protrusion section are formed. This technique enables shortening of cycle time needed for manufacture as compared with a technique needing die opening performed for example by pressing die in a radial direction of a circular arc to form a circular-arc shaped section and then opening the dies and forming a crank-shaped section by dies for forming the crank-shaped section. In this case, when a flat rectangular conductor formed with the circular-arc shaped section in a first step has to be shifted to a next stage to form a crank-shaped section, some works are necessary to open the dies, change clamping of the flat rectangular conductor from a die to another, and transfer the flat rectangular conductor. To the contrary, using the first and second forming dies enables forming the circular-arc shaped section, crank-shaped section, and protrusion section continuously, so that the above works can be eliminated, contributing to a reduction cost of the forming steps. This can achieve cost reduction of the segment coil.

In the configuration disclosed in (2), in the segment coil manufacturing method described in (1), the method includes holding the flat rectangular conductor by a holding mechanism between the first forming die and the second forming die in a direction intersecting with a moving direction of the first forming die while the first and second forming dies are in a die open state. In the present application, the wording "holding to intersect with the moving direction of the first forming die" means holding a flat rectangular conductor in a nearly perpendicular direction to the moving direction of the first forming die and the term "nearly perpendicular" includes a somewhat angular width as compared with a term "perpendicular". Since the flat rectangular conductor is held in advance by the holding mechanism, it is possible to hold the flat rectangular conductor in an optimum position as compared with a case where processing is started from a state where a flat rectangular conductor is set in either the first forming die or the second forming die. This can increase the processing freedom. Accordingly, enhanced shape accuracy of the segment coil can be achieved.

In the configuration disclosed in (3), in the segment coil manufacturing method described in (1) or (2), circular-arc shaped section forming faces to form the circular-arc shaped section and crank-shaped section forming faces to form the crank-shaped section are provided along the moving direction of the first forming die, the method includes: bending the flat rectangular conductor in a flatwise direction by the circular-arc shaped section forming faces formed in the first forming die and the second forming die to form the circular-arc shaped section, and bending a part of the circular-arc shaped section in the flatwise direction into a crank shape by the crank-shaped section forming faces formed in the first forming die and the second forming die to form the crank-shaped section, and deforming the flat rectangular conductor in an edgewise direction by protrusion section forming faces formed in the first forming die and the second forming die to form the protrusion section.

Since the circular-arc shaped section forming faces and the crank-shaped section forming faces are formed along the moving direction of the first forming die, the flat rectangular conductor is continuously plastically deformed by the forming die, thereby forming the circular-arc shaped section and the crank-shaped section. For instance, the circular-arc shaped section forming faces are each defined by a continuously changing curved surface. After the second forming die is placed to face the first forming die, when the first forming die is moved with respect to the second forming die while the flat rectangular conductor is located between the circular-arc shaped section forming face of the first forming die and the circular-arc shaped section forming face of the second forming die, the flat rectangular conductor can be bent in the flatwise direction.

The applicant has confirmed that when the flat rectangular conductor was continuously plastically deformed by use of the circular-arc shaped section forming faces and the crank-shaped section forming faces, an amount of spring back which would be caused in the segment coil could be reduced. Reducing the amount of spring back which may occur in the segment coil leads to enhanced shape accuracy of the segment coil.

In the configuration disclosed in (4), in the segment coil manufacturing method described in any one of (1) to (3), the forming die further include a third forming die and a fourth forming die, the first forming die, the second forming die, the third forming die, and the fourth forming die are placed in positions facing each other, the method includes moving a set of the first forming die and the fourth forming die and a set of the second forming die and the third forming die in a direction coming close to each other, to form an outer periphery of the circular-arc shaped section by the circular-arc shaped section forming faces of the first forming die and the third forming die and an inner periphery of the circular-arc shaped section by the circular-arc shaped section forming faces of the second forming die and the fourth forming die, to form the crank-shaped section in the flat rectangular conductor by the crank-shaped section forming faces of the first forming die and the second forming die and the crank-shaped section forming faces of the third forming die and the fourth forming die, the crank-shaped section forming faces being provided so that centers of circular-arcs defining the crank-shaped section forming faces are different from each other, and to form an outer surface of the protrusion section by the protrusion section forming faces of the first forming die and the fourth forming die and an inner surface of the protrusion section is formed by the protrusion section forming faces of the second forming die and the third forming die.

Since four forming dies are used to form the circular-arc shaped section, crank-shaped section, and protrusion section in the flat rectangular conductor, the flexibility in processing in the segment coil manufacture can be increased and thus the shape accuracy of the segment coil can be more enhanced. This is because the flat rectangular conductor can be held in the optimum position by the flat rectangular conductors when each section of the segment coil is to be shaped. Since the forming die is separable into four sections, the shape of the forming die can be made simple. This can enhance the accuracy of the die and reduce the cost of the die.

In the configuration disclosed in (5), in the segment coil manufacturing method described in (4), the method includes forming a stepped section in the segment coil at the coil end by stepped section forming faces formed in the first forming die and the fourth forming die or in the second forming die and the third forming die by utilizing a gap provided between a set of the first forming die and the second forming die and a set of the third forming die and the fourth forming die. For instance, the segment coil is formed so that the stepped section is located in a position corresponding to a coil end when the segment coil is inserted on a stator core, the side surface of the stepped section can be used as a reference of the segment coil. The side surfaces of the stepped section formed in the segment coil is formed by the first forming die and the fourth forming die or by the second forming die and the third forming die and thus can be shaped with the same accuracy as the forming die. Due to characteristics of the shape of the segment coil, a portion that will be the reference surface is hard to form. However, since a reference surface such as the side surfaces of the stepped section is provided, it is possible to enhance the accuracy of mounting the segment coil in the stator core.

In the configuration disclosed in (6), in the segment coil manufacturing method described in any one of (1) to (5), the method includes moving a shoulder forming die along a side face of the forming die to bend the flat rectangular conductor in the edgewise direction. Since the shoulder forming die is moved along the side faces of the forming die, the shoulder sections of the segment coil are formed with reference to the side faces of the forming die. Furthermore, the shoulder sections can be formed while the flat rectangular conductor is held by the forming die. This does not need shifting the segment coil from a die to another during forming of the segment coil and thus can enhance the shape accuracy of the shoulder sections formed in the segment coil.

In the configuration disclosed in (7), in the segment coil manufacturing method described in any one of (1) to (6), after the circular-arc shaped section and the crank-shaped section are formed in the flat rectangular conductor, the method includes forming a shift section in a crank shape by bending the flat rectangular conductor in the flatwise direction by a shift section forming die while holding the flat rectangular conductor by the forming die. Regarding the shift section of the segment coil, the shift section is also formed while the flat rectangular conductor is held by the forming die after the circular-arc shaped section, crank-shaped section, and protrusion section are formed in the flat rectangular conductor, so that shifting the flat rectangular conductor from a die to another is not necessary. This makes it possible to enhance the shape accuracy of the segment coil.

The segment coil manufacturing device in another aspect of the present invention configured as above can provide the following operations and advantageous effects.

The configuration disclosed in (8) is a segment coil manufacturing device including a forming die arranged to bend a flat rectangular conductor to form a circular-arc shaped section, a crank-shaped section, and a protrusion section in a segment coil, wherein the forming die include a first forming die and a second forming die, and the first forming die and the second forming die have circular-arc shaped section forming faces, crank-shaped section forming faces, and protrusion section forming faces to continuously form the circular-arc shaped section, the crank-shaped section, and the protrusion section while holding at least two surfaces of outer surfaces of the flat rectangular conductor.

Since each of the first forming die and the second forming die is provided with the circular-arc shaped section forming face, the crank-shaped section forming face, and the protrusion section forming face, the circular-arc shaped section, crank-shaped section, and protrusion section can be formed continuously in the flat rectangular conductor. This can eliminate the process including die-opening, die-closing, or inter-die transfer in the segment coil manufacturing steps, leading to shortening of the cycle time of the segment coil manufacturing steps.

In the configuration disclosed in (9), the segment coil manufacturing device described in (8) further includes a holding mechanism placed between the first forming die and the second forming die and configured to hold the flat rectangular conductor in a direction intersecting with a moving direction of the first forming die while the first forming die and the second forming die are in a die open state. Since the holding mechanism for holding the flat rectangular conductor is provided, the flat rectangular conductor can be held in the optimum position as compared with a case where processing is started from a state where the flat rectangular conductor is held in advance by either the first forming die or the second forming die. This makes it possible to increase the processing flexibility and thus achieve the enhanced shape accuracy of the segment coil.

In the configuration disclosed in (10), in the segment coil manufacturing device described in (8) or (9), the circular-arc shaped section forming faces are curved faces to form the circular-arc shaped section by bending the flat rectangular conductor in a flatwise direction, the crank-shaped section forming faces are curved faces to form the crank-shaped section by bending a part of the circular-arc shaped section in the flatwise direction into a crank shape, the protrusion section forming faces are curved faces to form the protrusion section by deforming the flat rectangular conductor in an edgewise direction, and the circular-arc shaped section forming faces and the crank-shaped section forming faces are provided along the moving direction of the first forming die and the edgewise direction of the flat rectangular conductor.

Since the circular-arc shaped section forming faces and the crank-shaped section forming faces are formed along the moving direction of the first forming die and in the edgewise direction of the flat rectangular conductor, the flat rectangular conductor can be continuously plastically deformed to form the circular-arc shaped section and the crank-shaped section. The flat rectangular conductor is subjected to continuous plastic deformation using the circular-arc shaped section forming faces and the crank-shaped section forming faces, thereby enabling a reduction in amount of spring back which may be caused in the segment coil. Furthermore, the first forming die and the second forming die include the protrusion forming faces, thereby enabling continuous plastic deformation of the protrusion section following formation of the circular-arc shaped section forming face and the crank-shaped section forming face. Consequently, the shape accuracy of the segment coil can be enhanced.

In the configuration disclosed in (11), in the segment coil manufacturing device described in any one of (8) to (10), the forming die further include a third forming die and a fourth forming die, the first forming die, the second forming die, the third forming die, and the fourth forming die are placed in positions facing each other, the first forming die and the fourth forming die are moved in the same direction, and the second forming die and the fourth forming die are moved in a direction to come close to the first forming die and the fourth forming die, the first forming die and the third forming die include the circular-arc shaped section forming faces to form an outer periphery of the circular-arc shaped section and the crank-shaped section forming faces to form an outer periphery of the crank-shaped section, the second forming die and the fourth forming die include the circular-arc shaped section forming faces to form an inner periphery of the circular-arc shaped section and the crank-shaped section forming faces to form an inner periphery of the crank-shaped section, the first forming die and the fourth forming die include the protrusion section forming faces to form an outer surface of the protrusion section, the second forming die and the third forming die include the protrusion section forming faces to form an inner surface of the protrusion section, and the crank-shaped section forming faces are provided in the first forming die to the fourth forming die so that the crank-shaped section forming faces of the first forming die and the second forming die and the crank-shaped section forming faces of the third forming die and the fourth forming die are different in centers of circular-arcs defining the crank-shaped section forming faces from each other.

Since four forming dies are used to form the circular-arc shaped section, the crank-shaped section, and the protrusion section in the flat rectangular conductor, processing can be made with higher accuracy. This is because the flat rectangular conductor can be held in the optimum position by the forming die when each section of the conductor is to be formed. Because of the forming die consisting of four separable dies, the shape of the forming die can be simplified and thus the cost of the die can be restrained.

In the configuration disclosed in (12), in the segment coil manufacturing device described in (11), stepped section forming faces are formed in the first forming die and the fourth forming die or in the second forming die and the third forming die by utilizing a gap between a set of the first forming die and the second forming die and a set of the third forming die and the fourth forming die. The side surfaces of the stepped section provided in the segment coil are formed by the first forming die and the fourth forming die or by the second forming die and the third forming die. Accordingly, the side surfaces of the stepped section can be formed with the same accuracy as the forming faces provided in the forming die. Since the shape accuracy of the stepped section can be enhanced in this manner, it can be used as the reference of the segment coil. Due to characteristics of the shape of the segment coil, a portion that will be the reference surface is hard to form. However, since the side surfaces of the stepped section serves as the reference surface, it is possible to enhance the accuracy of mounting the segment coil in the stator core.

In the configuration disclosed in (13), the segment coil manufacturing device described in any one of (8) to (12) further includes a shoulder forming die configured to move along a side face of the forming die and bend the flat rectangular conductor in the edgewise direction. The shoulder sections of the segment coil can be formed with reference to the side surfaces of the forming die and the shoulder sections can be formed while the flat rectangular conductor is held by the forming die. This does not need to shift the segment coil from a die to another and can enhance the shape accuracy of the shoulder sections.

In the configuration disclosed in (14), the segment coil manufacturing device described in any one of (8) to (13) further includes a shift-section forming die to form a shift section in a crank shape by bending the flat rectangular conductor in the flatwise direction while the flat rectangular conductor is held by the forming die. Regarding the shift section of the segment coil, the shift section is formed while the flat rectangular conductor is held by the forming die after the circular-arc shaped section and the crank-shaped section are formed in the flat rectangular conductor, there is no need to shift the flat rectangular conductor from a die to another. This can enhance the shape accuracy of the segment coil.

Still further, the segment coil in another aspect of the invention configured as above can provide the following operations and advantageous effects.

The configuration disclosed in (15) is the segment coil including a circular-arc shaped section, a crank-shaped section, and a protrusion section at a coil end, the segment coil having a rectangular cross section, wherein the segment coil is manufactured by use of a segment coil manufacturing device according to any one of (8) to (14). Since the segment coil is formed efficiently by the segment coil manufacturing method of (1) to (7) or by use of the segment coil manufacturing device of (8) to (14), the cost reduction of the segment coil can be achieved.

MODE FOR CARRYING OUT THE INVENTION

A detailed description of an embodiment of the present invention will now be given referring to the accompanying drawings.

Figure 6:
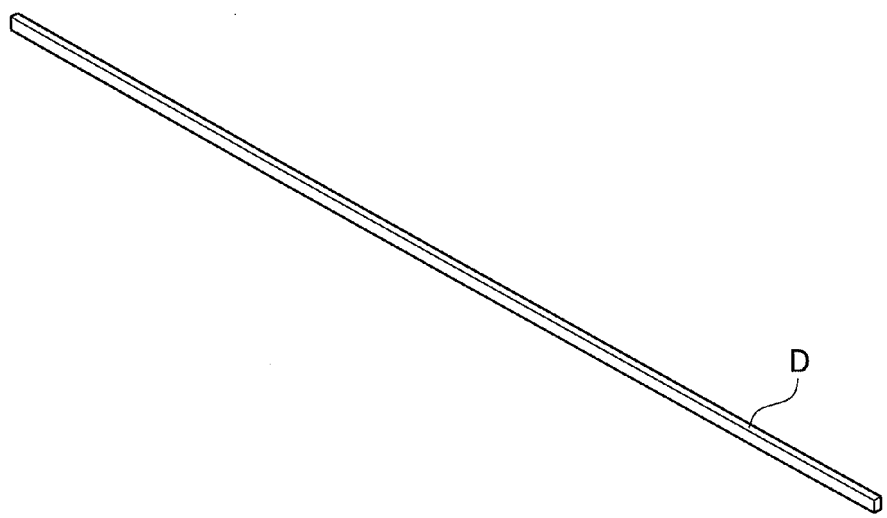
FIG. 6 is a perspective view of the flat rectangular conductor in the embodiment.
Figure 7:
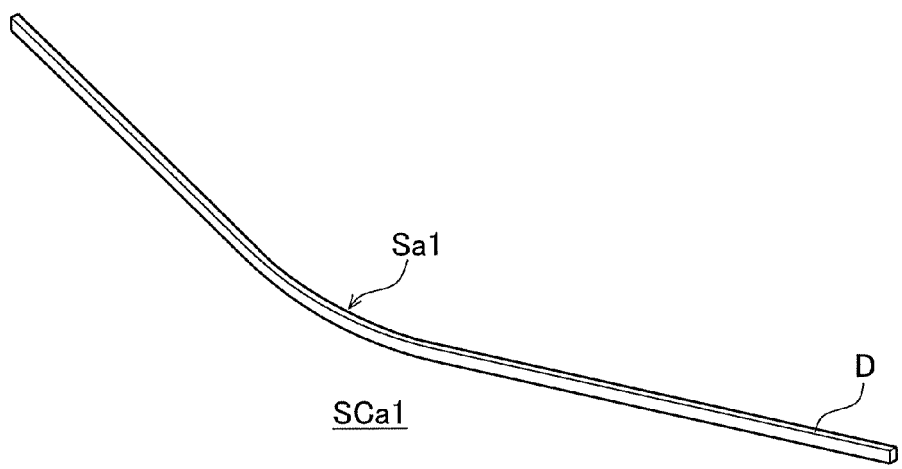
FIG. 7 is a perspective view of the flat rectangular conductor formed with the circular-arc section in the embodiment.
Figure 8:
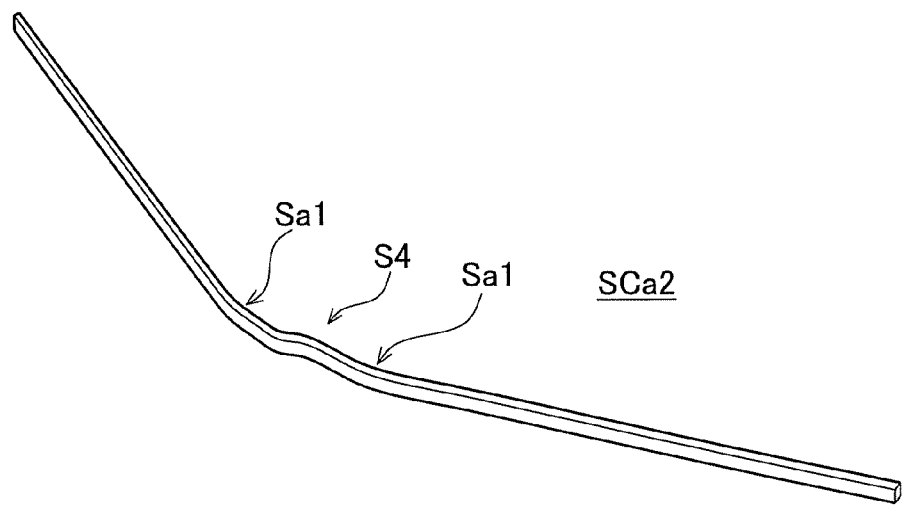
FIG. 8 is a perspective view of the flat rectangular conductor formed with the crank section in the embodiment.
Figure 9:
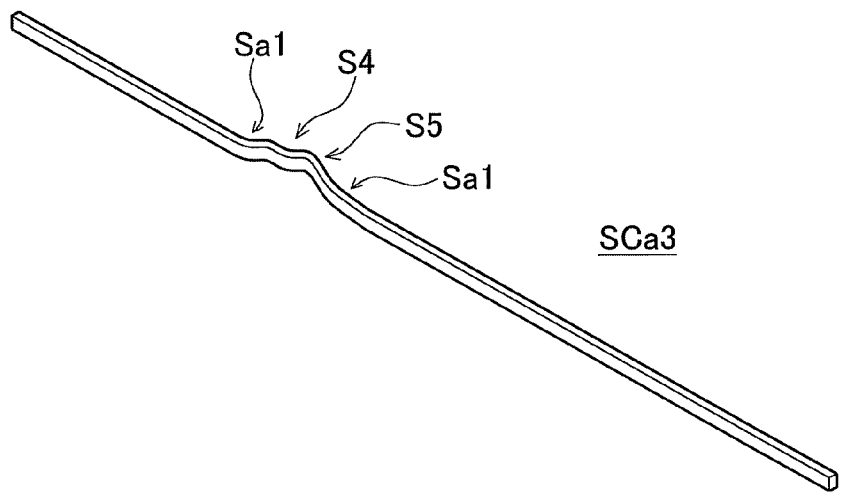
FIG. 9 is a perspective view of the flat rectangular conductor formed with the protrusion section in the embodiment.
Figure 10:
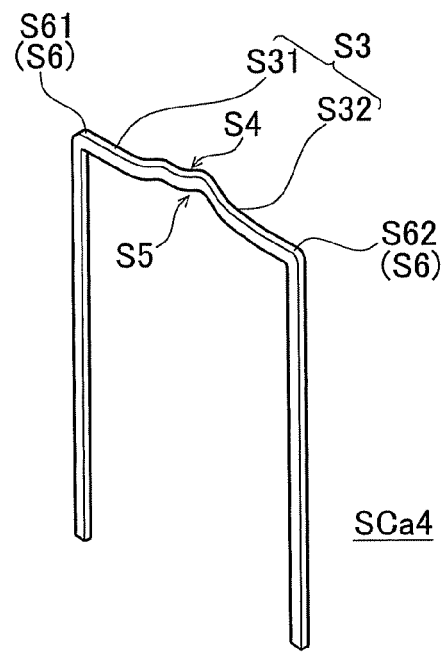
FIG. 10 is a perspective view of the flat rectangular conductor formed with the shoulder sections in the embodiment.
Figure 11:
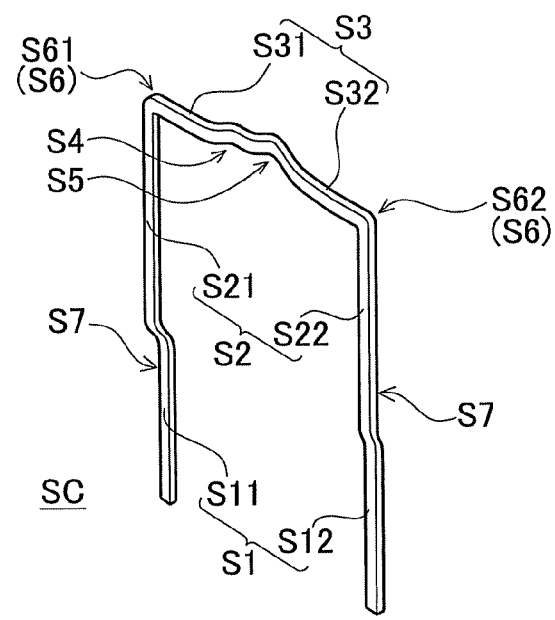
FIG. 11 is a perspective view of a segment coil in the embodiment.
Figure 12:
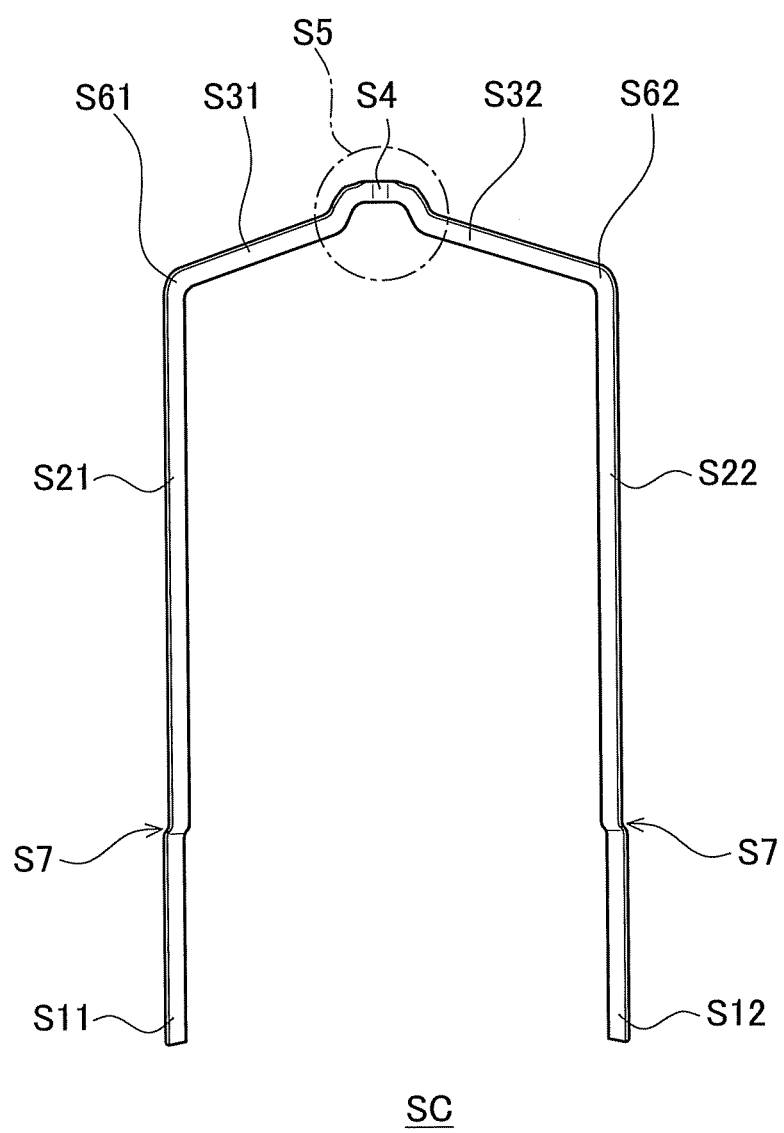
FIG. 12 is a plan view of the segment coil in the embodiment.

FIG. 11 is a perspective view of a segment coil SC in the present embodiment. FIG. 12 is a plan view of the segment coil SC. FIG. 6 is a perspective view of a flat rectangular conductor D. FIG. 7 is a perspective view of the flat rectangular conductor D formed with a circular-arc section. FIG. 8 illustrates the flat rectangular conductor D formed with a crank section. FIG. 9 illustrates the flat rectangular conductor formed with a protrusion section. FIG. 10 illustrates the flat rectangular conductor D formed with shoulder sections. As the segment coil SC, a plurality of segment coils slightly different in shape from one shown in FIG. 11 are required. Since they are similar in shape, however, their details are omitted.

The segment coil SC is formed of the flat rectangular conductor D shown in FIG. 6. The flat rectangular conductor D is a wire that is made of high conductive metal such as copper and has a rectangular cross section. The flat rectangular conductor D is entirely coated with insulating coating such as enamel necessary to ensure insulation between the segment coil SC and a stator core not shown. In the present embodiment, a conductive wire having a predetermined length as shown in FIG. 6 is referred to as the flat rectangular conductor D. However, a plurality of segment coils different in type are necessary for a state core not shown and thus the flat rectangular conductors D having different lengths are also necessary. In the present description, therefore, any conductive wire having a required length and a rectangular cross section is referred to as the flat rectangular conductor D.

The segment coil SC includes lead sections S1 to be joined to an end of another segment coil SC after the segment coils SC are inserted on a stator core not shown, in-slot wire sections S2 to be placed in slots of the stator core not shown, inclined sections S3 to be placed at a coil end of the stator not shown, a crank section S4 formed for lane change of the segment coils SC, a protrusion section S5 formed to protrude in an axial direction of the stator not shown from the inclined sections S3 as shown in FIG. 12, shoulder sections S6 formed by edgewise bending to join the inclined sections S3 and the in-slot wire sections S2, and slot-section shifts S7 (portions shifting the lead sections S1 in a radial direction outward than the in-slot wire sections S2) formed to adjust the positions of the sections S11 and S12 in a radial direction at the coil end of the stator not shown. The slot-section shifts S7 are not necessarily formed according to the types of segment coils SC. However, unless otherwise noted, the segment coils SC will be explained as having the slot-section shifts S7 for convenience of explanation.

The lead sections S1 include a first lead section S11 and a second lead section S12. The in-slot wire sections S2 include a first in-slot wire section S21 and a second in-slot wire section S22. The inclined sections S3 include a first inclined section S31 and a second inclined section S32. The shoulder sections S6 include a first shoulder section S61 and a second shoulder section S62. Although the above sections are given an ordinal word, "first" or "second", for convenience of explanation, they are identical in configuration.

The segment coils SC configured as above are prepared by a plurality of types and a plurality of pieces suitable for placement in a stator not shown. For instance, for a stator with 48 slots and 10 layers, 240 segment coils SC are prepared so as to include ten or more different shapes.

Each segment coil SC is produced in the steps shown in FIGS. 6 to 12. The flat rectangular conductor D shown in FIG. 6 is a wire having a predetermined length obtained by cutting. An arc-section formed body SCa1 is produced by forming a circular-arc section Sa1 in the flat rectangular conductor D around its center, specifically, by bending the conductor D in a flatwise direction to form the circular-arc section Sa1 having a predetermined radius. A crank formed body SCa2 shown in FIG. 8 is produced by forming a crank section S4 in the arc-section formed body SCa1, specifically, by further bending the flat rectangular conductor D at around the center of the circular-arc section Sa1 in the flatwise direction. A protrusion formed body SCa3 shown in FIG. 9 is produced by forming a protrusion section S5 in the crank formed body SCa2, specifically, by pressing the center of the circular-arc section Sa1 in the edgewise direction.

A shoulder formed body SCa4 shown in FIG. 10 is produced by forming the shoulder sections S6 in the protrusion formed body SCa3, thereby forming the first shoulder section S61, second shoulder section S62, first inclined section S31, and second inclined section S32. This shoulder formed body SCa4 is then processed in the flatwise direction to further form the slot-section shifts S7, thus shaped into the segment coil SC. Note that some of the segment coils SC are not formed with the slot-section shifts S7. The slot-section shifts S7 allow the first lead section S11 or the second lead section S12 to escape toward an inner circumference side or an outer circumference side of the stator core not shown to provide space necessary for welding. This space may be used as the space in which an interphase insulation sheet is inserted as needed.

The configuration of the segment coil forming device for forming the segment coils SC will be explained below.

Figure 1:
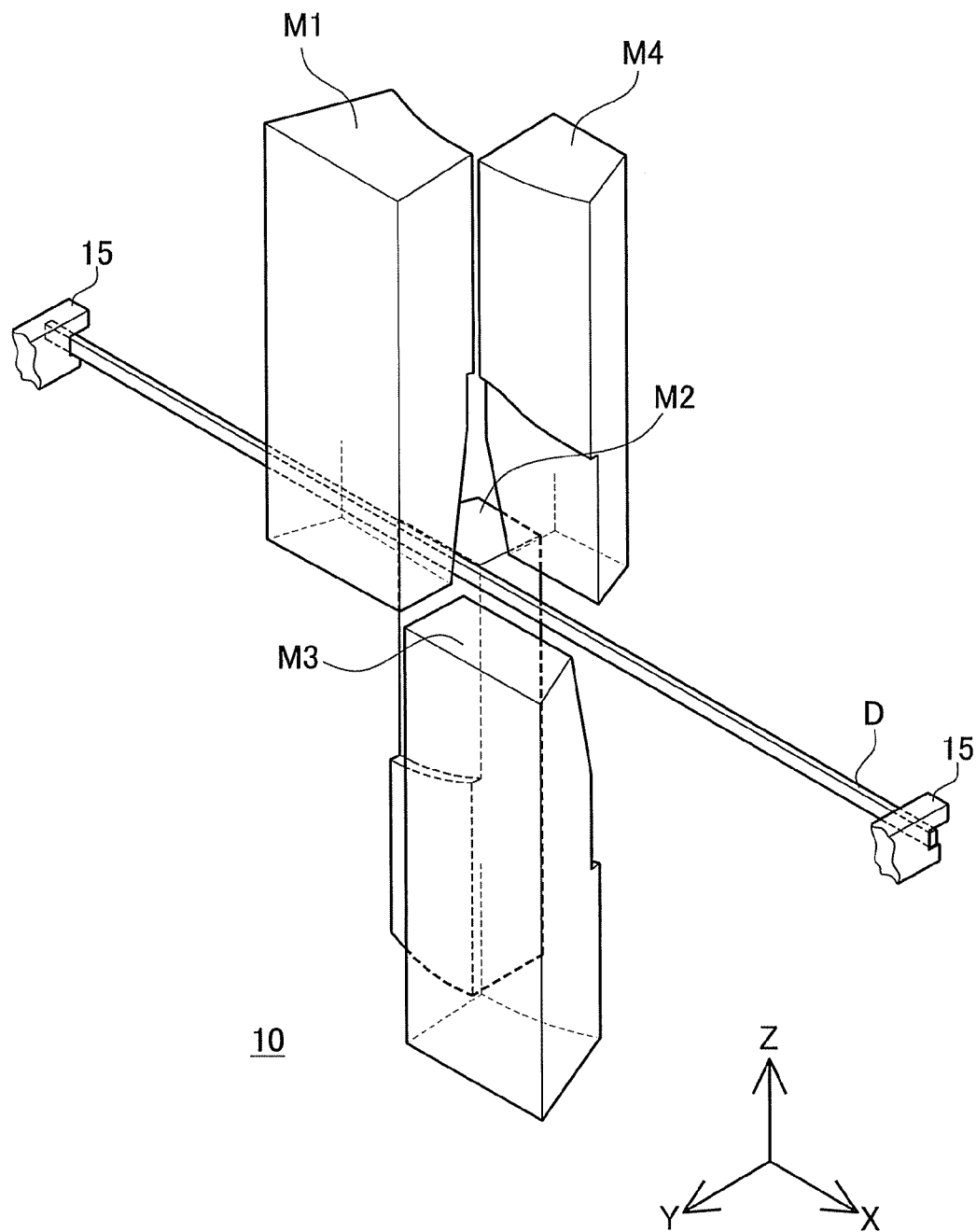
FIG. 1 is a perspective view of a main part of a segment coil forming device in an embodiment.
Figure 13A:
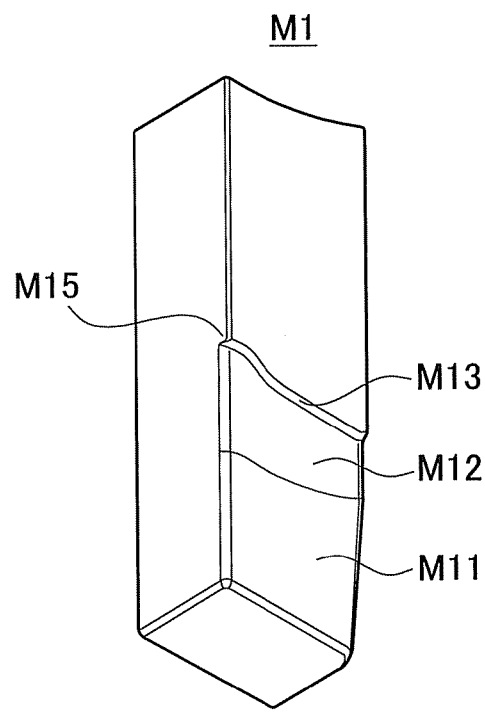
FIG. 13A is a perspective view of an outer peripheral surface forming upper die seen from inside and below the main part in the embodiment.
Figure 13B:
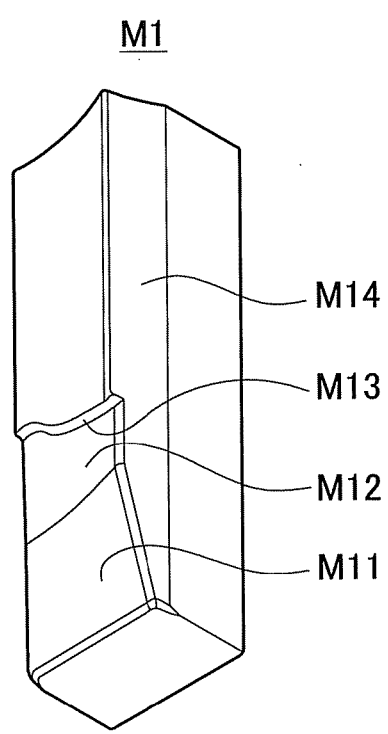
FIG. 13B is a perspective view of the outer peripheral surface forming upper die seen from outside and below the main part in the embodiment.
Figure 14A:
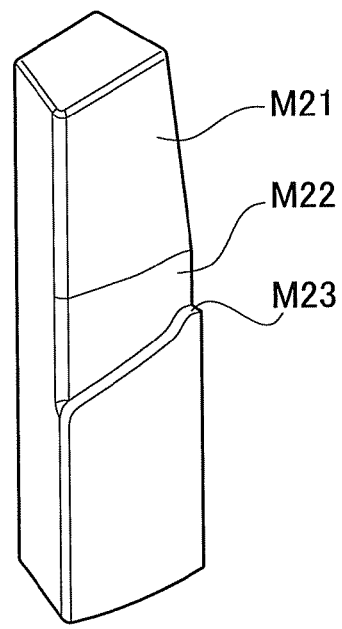
FIG. 14A is a perspective view of an inner peripheral surface forming lower die seen from outside and above the main part in the embodiment.
Figure 14B:
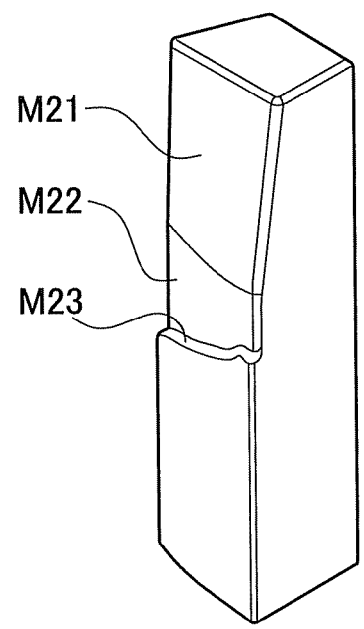
FIG. 14B is a perspective view of the inner peripheral surface forming lower die seen from inside and above the main part in the embodiment.
Figure 15A:
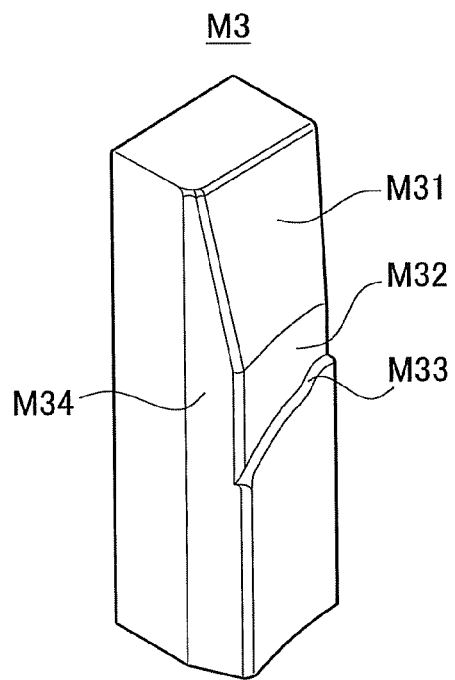
FIG. 15A is a perspective view of an outer peripheral surface forming lower die seen from outside and above the main part in the embodiments.
Figure 15B:
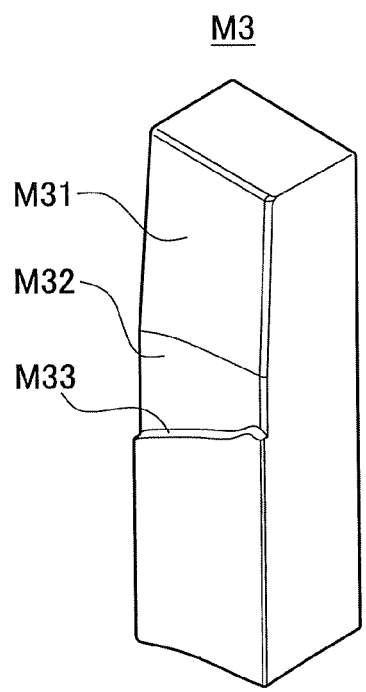
FIG. 15B is a perspective view of the outer peripheral surface forming lower die seen from inside and above the main part in the embodiment.
Figure 16A:
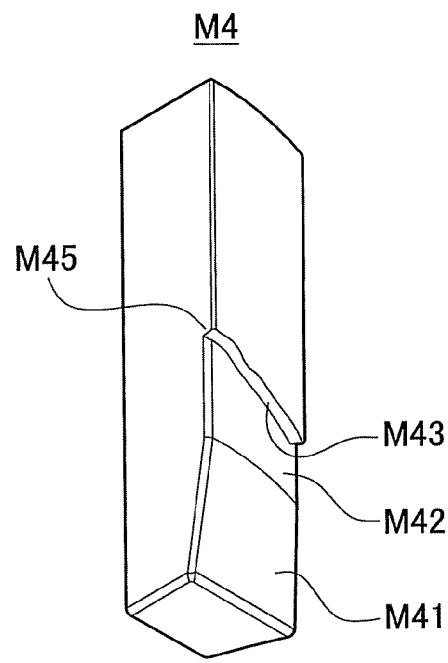
FIG. 16A is a perspective view of an inner peripheral surface forming upper die seen from inside and below the main part in the embodiment.
Figure 16B:
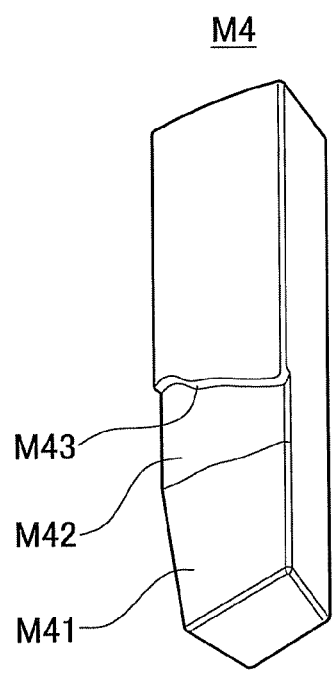
FIG. 16B is a perspective view of the inner peripheral surface forming upper die seen from outside and below the main part in the embodiment.

FIG. 1 is a perspective view of the main part of the segment coil forming device. FIG. 13 show perspective views of an outer peripheral surface forming upper die M1; FIG. 13A is a perspective view of the same seen from inside and below the main part 10 and FIG. 13B is a perspective view of the same seen from outside and below the main part 10. FIG. 14 show perspective views of an inner peripheral surface forming lower die M2; FIG. 14A is a perspective view of the same seen from outside and above the main part 10 and FIG. 14B is a perspective view of the same seen from inside and above the main part 10. FIG. 15 show perspective views of an outer peripheral surface forming lower die M3; FIG. 15A is a perspective view of the same seen from outside and above the main part 10 and FIG. 15B is a perspective view of the same seen from inside and above the main part 10. FIG. 16 show perspective views of an inner peripheral surface forming upper die M4; FIG. 16A is a perspective view of the same seen from inside and below the main part 10 and FIG. 16B is a perspective view of the same seen from outside and below the main part 10. Please note that the above dies are illustrated with omission of bolt holes and others used for connection with the segment coil forming device.

The outer peripheral surface forming upper die M1 includes a curved face M11, a circular-arc face M12, an end face M13, a side face M14, and a stepped section forming face M15 as shown in FIGS. 13A and 13B. The curved face M11 is a continuously changing curved surface provided to form the circular-arc section Sa1. The circular-arc face M12 is a surface formed in a circular-arc shape to conform to the outer peripheral surface of the circular-arc section Sa1 and to be concave along the outer periphery of the circular-arc section Sa1. The end face M13 is a surface for forming the protrusion section S5 and the inclined section S3. The outer peripheral surface forming upper die M1 pairs off with the outer peripheral surface forming lower die M3 mentioned later to form a surface of the segment coil SC that will face to the outer periphery side when the segment coil SC is placed in the stator not shown.

The inner peripheral surface forming lower die M2 includes a curved face M21, a circular-arc face M22, an end face M23 as shown in FIGS. 14A and 14B. The curved face M21 is a continuously changing curved surface provided to form the circular-arc section Sa1. The circular-arc face M22 is a surface formed in a circular-arc shape to conform to the inner peripheral surface of the circular-arc section Sa1 shown in FIG. 8 and others and to protrude along the inner periphery of the circular-arc section Sa1. The end face M23 is a surface for forming the protrusion section S5 and the inclined section S3. The inner peripheral surface forming lower die M2 pairs off with the inner peripheral surface forming upper die M4 mentioned later to form a surface of the segment coil SC that will face to the inner periphery side when the segment coil SC is placed in the stator not shown.

The outer peripheral surface forming lower die M3 includes a curved face M31, a circular-arc face M32, and an end face M33 and a side face M34 as shown in FIGS. 15A and 15B. The curved face M31 is a continuously changing surface provided to form the circular-arc section Sa1. The circular-arc face M32 is a surface formed to conform to the outer peripheral surface of the circular-arc section Sa1 and to be concave along the outer periphery of the circular-arc section Sa1. The end face M33 is a surface for forming the protrusion section S5 and the inclined section S3. The outer peripheral surface forming lower die M3 pairs off with the outer peripheral surface forming upper die M1 mentioned above to form a surface of the segment coil SC that will face to the outer periphery side when the segment coil SC is placed in the stator not shown.

The inner peripheral surface forming upper die M4 includes a curved face M41, a circular-arc face M42, an end face M43, and a stepped section forming face M45 as shown in FIGS. 16A and 16B. The curved face M41 is a continuously changing surface provided to form the circular-arc section Sa1. The circular-arc face M42 is a surface formed to conform to the inner peripheral surface of the circular-arc section Sa1 and to be convex along the inner periphery of the circular-arc section Sa1. The end face M43 is a surface for forming the protrusion section S5 and the inclined section S3. The inner peripheral surface forming upper die M4 pairs off with the aforementioned inner peripheral surface forming lower die M2 to form a surface of the segment coil SC that will face to the inner periphery when the segment coil SC is placed in the stator not shown.

The main part 10 of the segment coil forming device is constituted of four forming dies as shown in FIG. 1, that is, the outer peripheral surface forming upper die M1, the inner peripheral surface forming lower die M2, the outer peripheral surface forming lower die M3, and the inner peripheral surface forming upper die M4. The outer peripheral surface forming upper die M1, the inner peripheral surface forming lower die M2, the outer peripheral surface forming lower die M3, and the inner peripheral surface forming upper die M4 are moved in a direction of an Z axis to plastically deform the flat rectangular conductor D held by holding mechanisms 15 to form the segment coil SC. To be concrete, the outer peripheral surface forming upper die M1 and the inner peripheral surface forming upper die M4 are synchronously moved downward along the Z axis in FIG. 1, while the inner peripheral surface forming lower die M2 and the outer peripheral surface forming lower die M3 are synchronously moved upward along the Z axis in FIG. 1. Please note that a pair of the outer peripheral surface forming upper die M1 and the inner peripheral surface forming upper die M4 and a pair of the inner peripheral surface forming lower die M2 and the outer peripheral surface forming lower die M3 are respectively moved along the Z axis by a drive mechanism. As an alternative, one of the pairs may be fixed.

The drive mechanism not shown to be used for the outer peripheral surface forming upper die M1 to the inner peripheral surface forming upper die M4 is configured to move those dies at a predetermined speed in a direction to cause the inner peripheral surface forming lower die M2 and the outer peripheral surface forming lower die M3 to respectively face the outer peripheral surface forming upper die M1 and the inner peripheral surface forming upper die M4. The dies are moved only by the same stroke. Thus, a single drive mechanism is prepared and configured using trapezoidal thread screws not shown to synchronously operate the outer peripheral surface forming upper die M1 and the inner peripheral surface forming upper die M4. The outer peripheral surface forming upper die M1, the inner peripheral surface forming lower die M2, the outer peripheral surface forming lower die M3, and the inner peripheral surface forming upper die M4 prepared herein are different in shape in correspondence with the type of the segment coil SC and replaceably connected to the drive mechanism.

Figure 5:
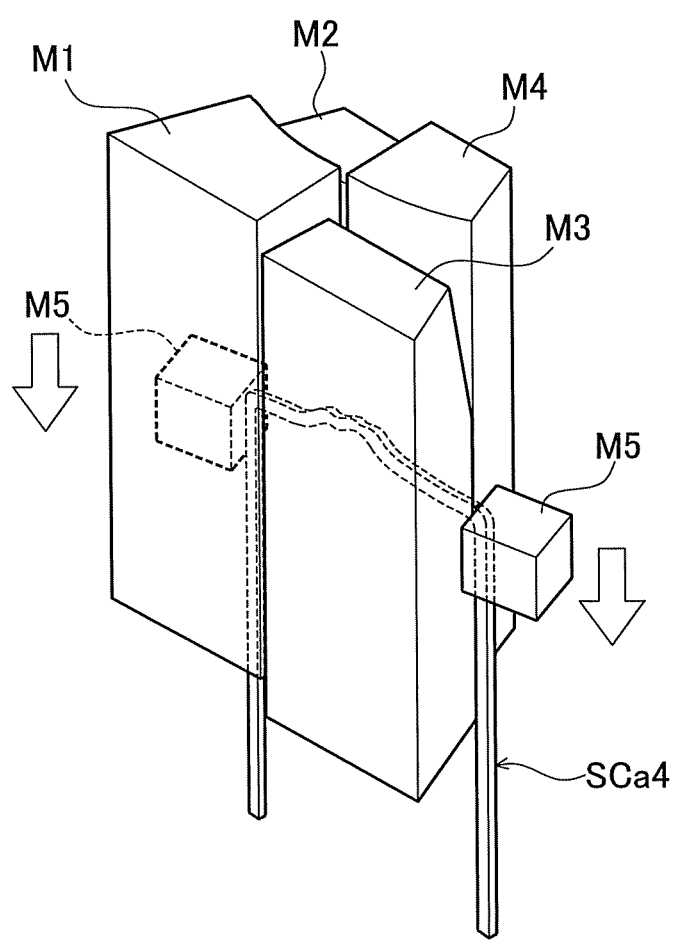
FIG. 5 is a perspective view showing a way to form shoulder sections in the flat rectangular conductor by the main part of the segment coil forming device in the embodiment.
Figure 23A:
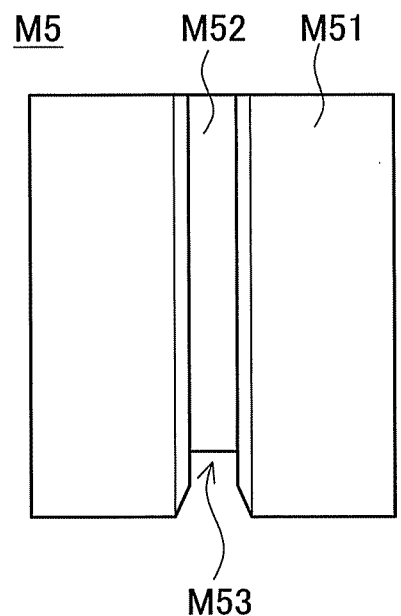
FIG. 23A is a front view of a shoulder forming die M5 in the embodiment.
Figure 23B:
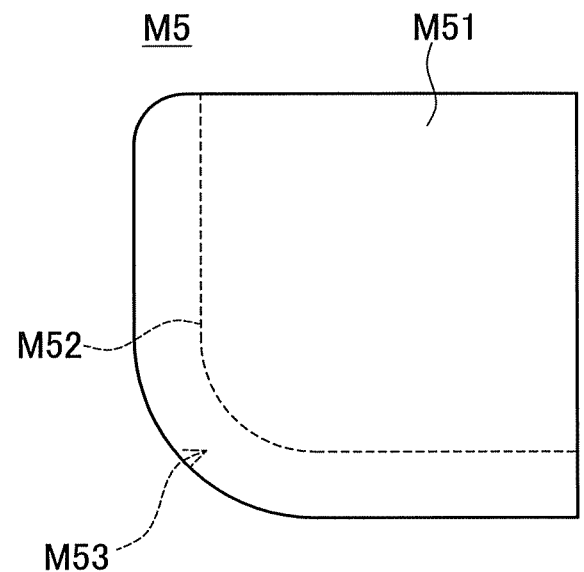
FIG. 23B is a side view of the shoulder forming die M5 in the embodiment.

FIG. 23A is a front view of a shoulder forming die M5. FIG. 23B is a side view of the shoulder forming die. The shoulder forming dies M5 are placed to move along both side faces of the main part 10 and move in the Z-axis direction as shown in FIG. 5. Each shoulder forming die M5 includes a side block M51 and a groove M52 as shown in FIGS. 23A and 23B. The side block M51 is a nearly parallelepiped rectangular block formed with a rounded corner M53. The groove M52 is provided extending along the center of the side block M51 and over two faces on both sides of the corner M53. Each shoulder forming die M5 is disposed to come into contact, from the corner M53, with the flat rectangular conductor D. Even though not illustrated, the shoulder forming dies M5 may be formed in a roller shape in order to reduce contact resistance or friction.

Figure 22A:
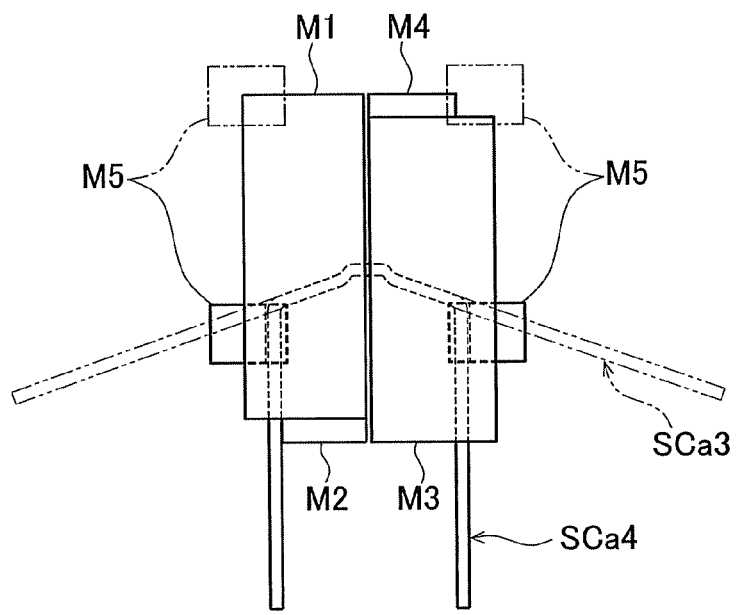
FIG. 22A is a front view showing a way to form the shoulder section in the flat rectangular conductor by the main part of the segment coil forming device in the embodiment.
Figure 22B:
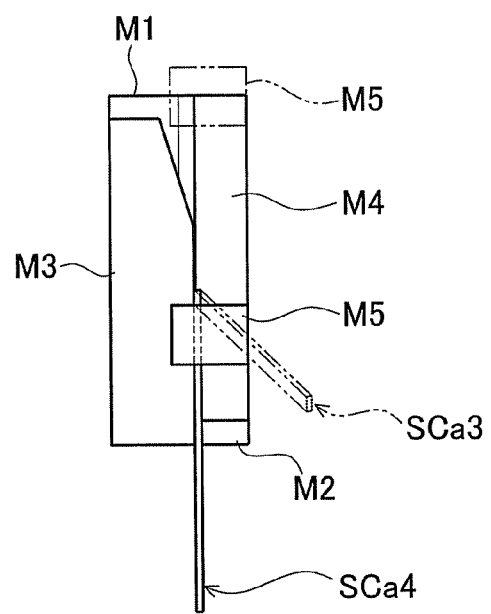
FIG. 22B is a side view showing the way to form the shoulder section in the flat rectangular conductor by the main part of the segment coil forming device in the embodiment.
Figure 24:
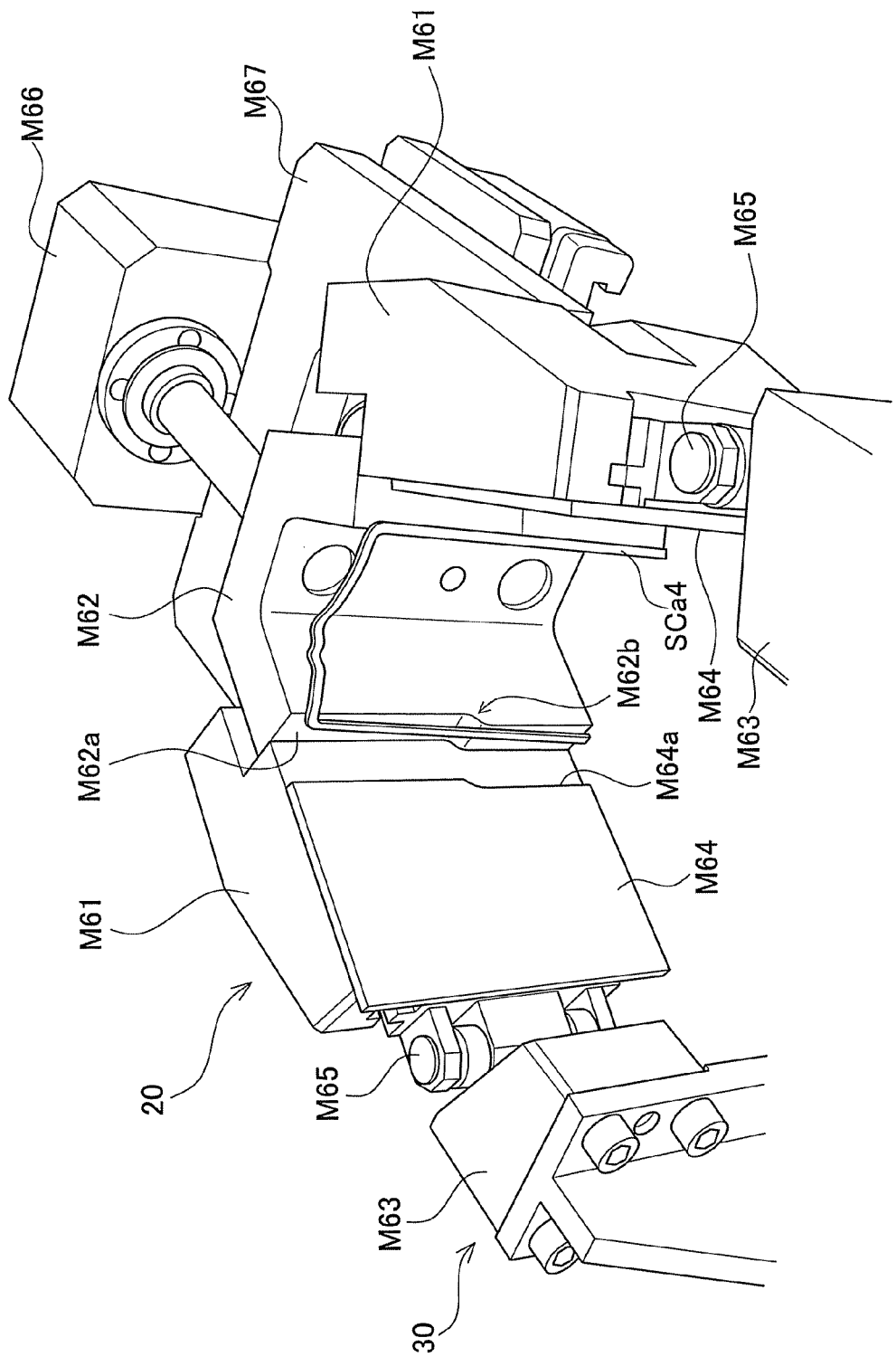
FIG. 24 is a perspective view of a shift-section forming device in the embodiment.
Figure 25:
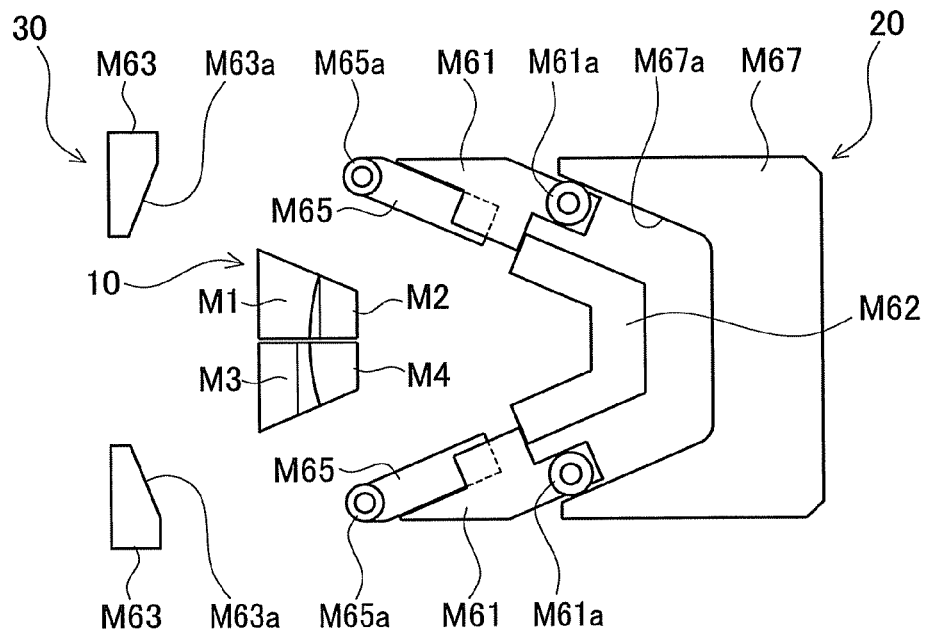
FIG. 25 is a plan view of a shift-section forming device in a standby position in the embodiment.
Figure 26:
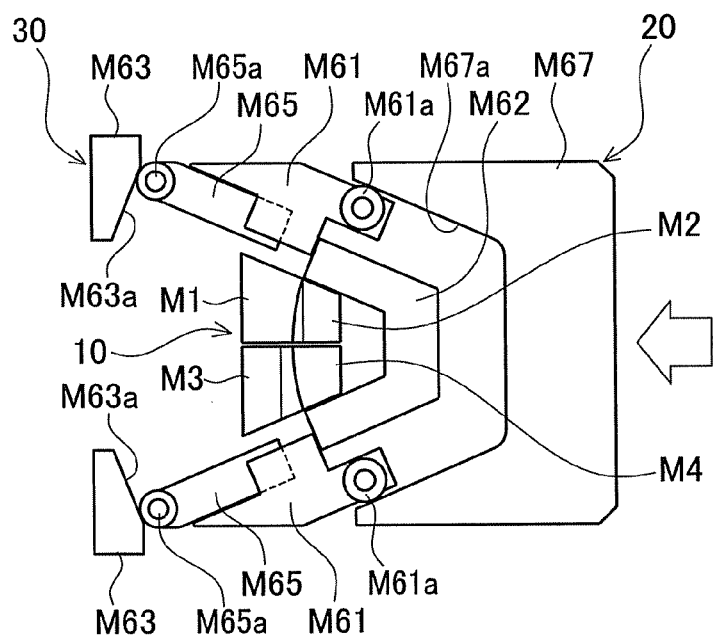
FIG. 26 is a plan view of the shift-section forming device in an advanced position with side dies opened in the embodiment.
Figure 27:
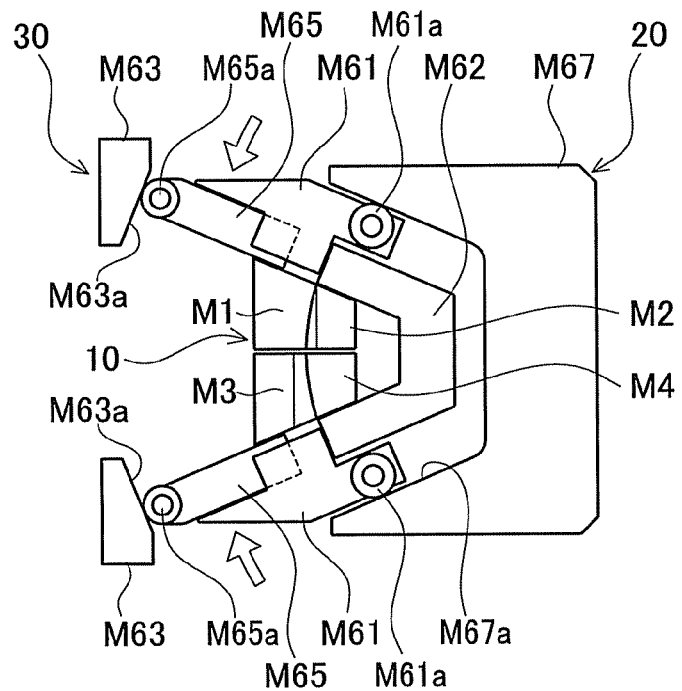
FIG. 27 is a plan view of the shift-section forming device in the advanced position with the side dies starting to move in the embodiment.
Figure 28:
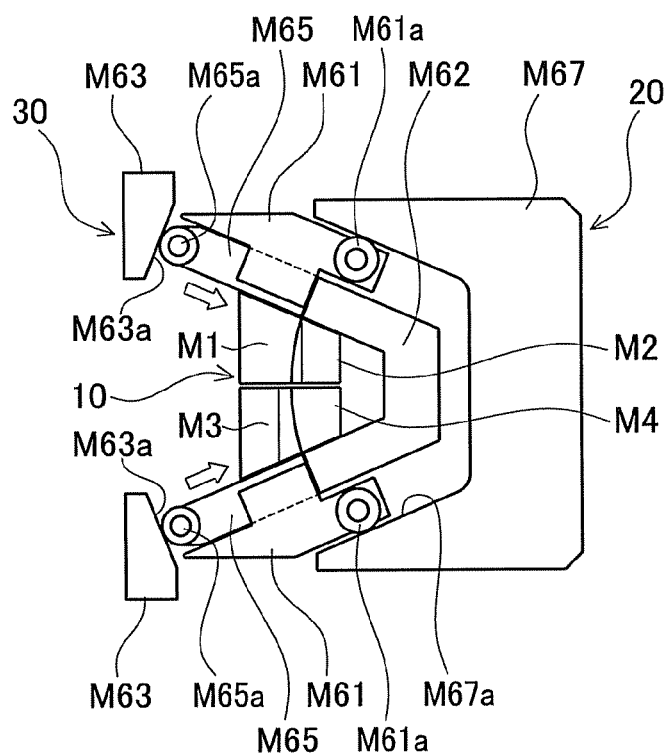
FIG. 28 is a plan view of the shift-section forming device in the advanced position with the side dies stopping moving in the embodiment.

FIG. 24 is a perspective view of the shift-section forming device 20. FIG. 25 is a plan view the shift-section forming device 20 in a standby position. FIG. 26 is a plan view of the shift-section forming device 20 in an advanced position with the side dies opened. FIG. 27 is a plan view of the shift-section forming device 20 in the advanced position with the side dies starting to move. FIG. 28 is a plan view of the shift-section forming device 20 in the advanced position with the side dies stopping moving. Although the shoulder-section formed body SCa4 originally has to be held by the main part 10 as shown in FIG. 5 or FIGS. 22A and 22B; however, the main part 10 is not illustrated in FIG. 24 for convenience of explanation. The shift-section forming device 20 is a device for forming the slot-section shifts S7 in the shoulder-section formed body SCa4 as shown in FIG. 24. Each outside die M61 includes a front-side die M64 and is configured to hold the shoulder-section formed body SCa4 between a back-side die face M62a of a back-side die M62 that is moved forward by a shaft holding block M66 and a front-side die face M64a of the front-side die M64, thereby forming the slot-section shifts S7.

Stoppers M63 constitute a fixing member 30 and will contact with roller guides M65a provided in outside-die holding members M65 attached to the outside dies M61. The stoppers M63 are configured to limit restrict a movable end of the shift-section forming device 20 having a drive mechanism not shown. The stoppers M63 each have a surface including a slant surface M63a whereby the roller guides 65a are guided to pull inward the outside dies M61. A movement guide base M67 functions to guide the outside dies M61.

With the above configuration, when the shift-section forming device 20 is moved forward toward the stoppers M63 by the drive mechanism not shown and the roller guides M65a come into contact with the stoppers M63 as shown in FIG. 26, the roller guides M65a provided in the outside-die holding members M65 are guided along the slant surfaces M63a as shown in FIG. 27 by a force to move the roller guides M65a inward. At the same time, the roller guides M61a provided in the outside dies M61 are guided along the guide groove M67a provided in the movement guide base M67 by a force to move the roller guides M61a inward. Accordingly, the outside dies M61 provided in the outer surface die holding members M65 are moved inward.

The shift-section forming device 20 is further advanced forward as shown in FIG. 28, thereby bringing the roller guides M65a into contact with the slant surfaces M63a of the stoppers M63 and thus pushing the roller guides M65a toward the back-side die M62. Consequently, the outside dies M61 and the back-side die M62 can clamp the first lead section S11 and the second lead section S12 of the shoulder-section formed body SCa4. The back-side die M62 and the front-side dies M64 are positioned in place so as to be subjected to tooling change and replaceably held with bolts. Thus, the shift-section forming device 20 enables formation of a plurality of different types of slot-section shifts S7. The back-side die M62 and the front-side dies M64 are prepared by a plurality of types according to the number of types of segment coils SC needing the slot-section shifts S7.

A process of forming the segment coil SC using the segment coil forming device briefly explained as above will be described below.

Figure 2:
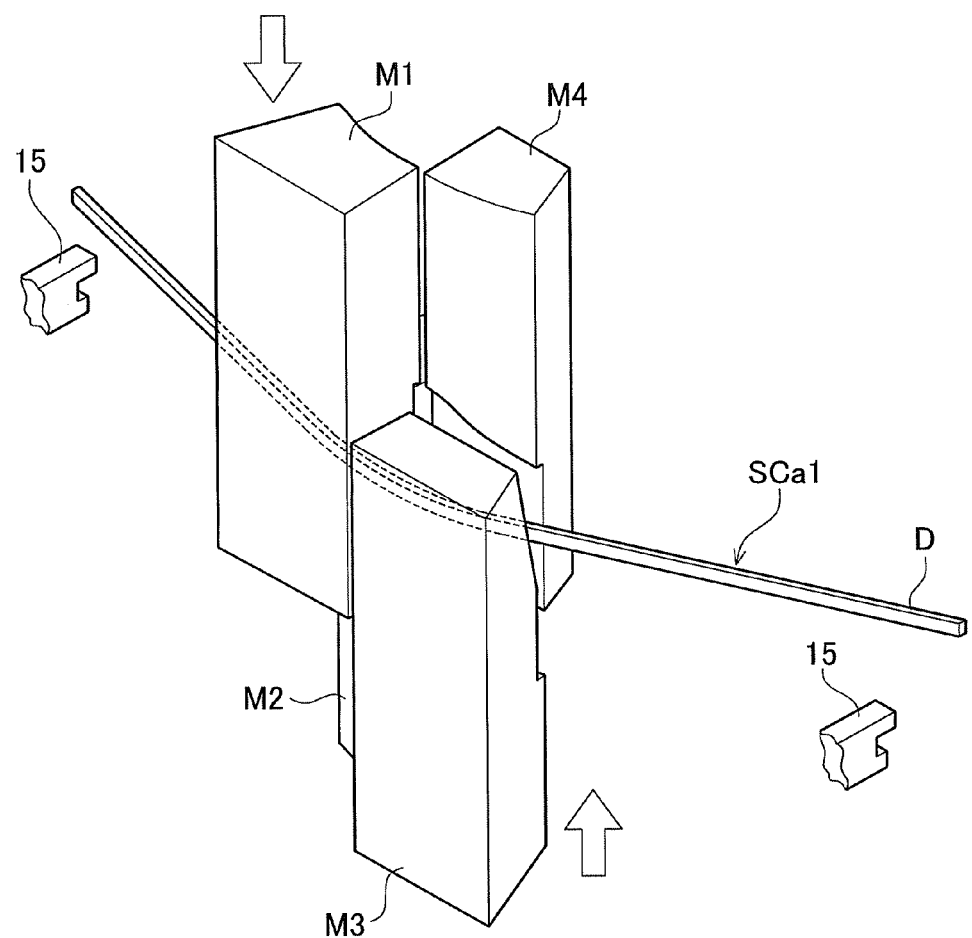
FIG. 2 is a perspective view showing a way to form a circular-arc section in a flat rectangular conductor by the main part of the segment coil forming device in the embodiment.
Figure 3:
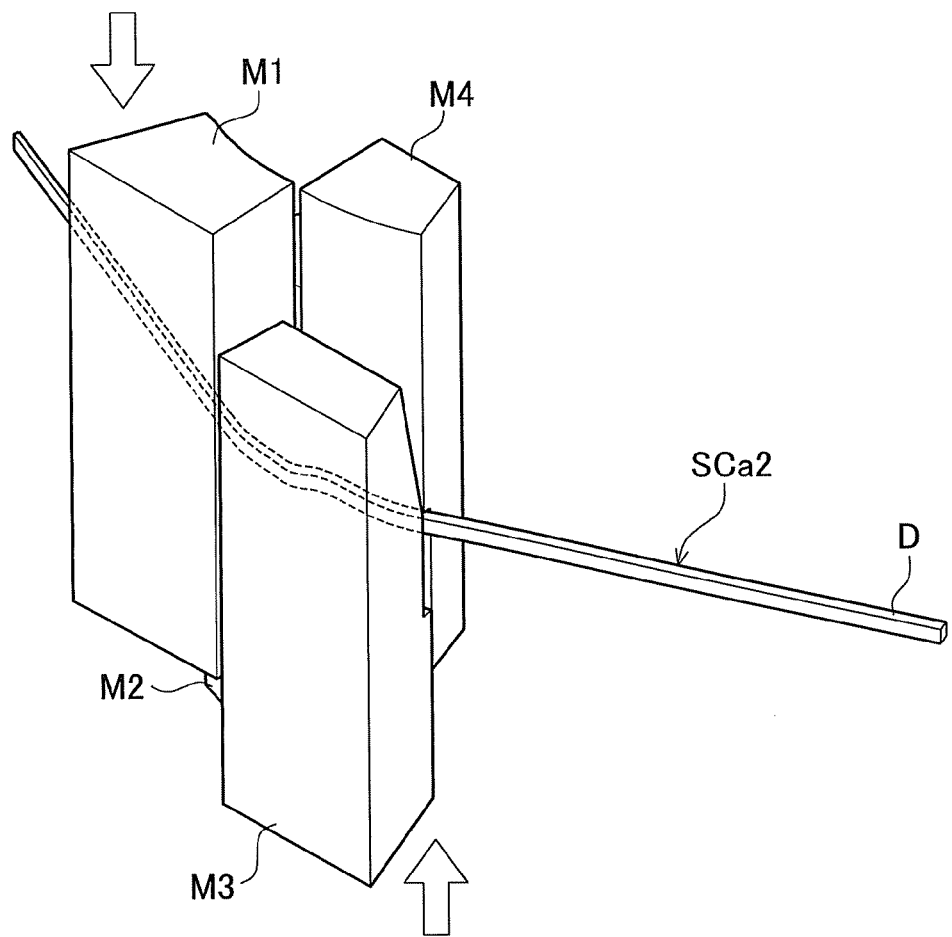
FIG. 3 is a perspective view showing a way to form a crank section in the flat rectangular conductor by the main part of the segment coil forming device in the embodiment.
Figure 4:
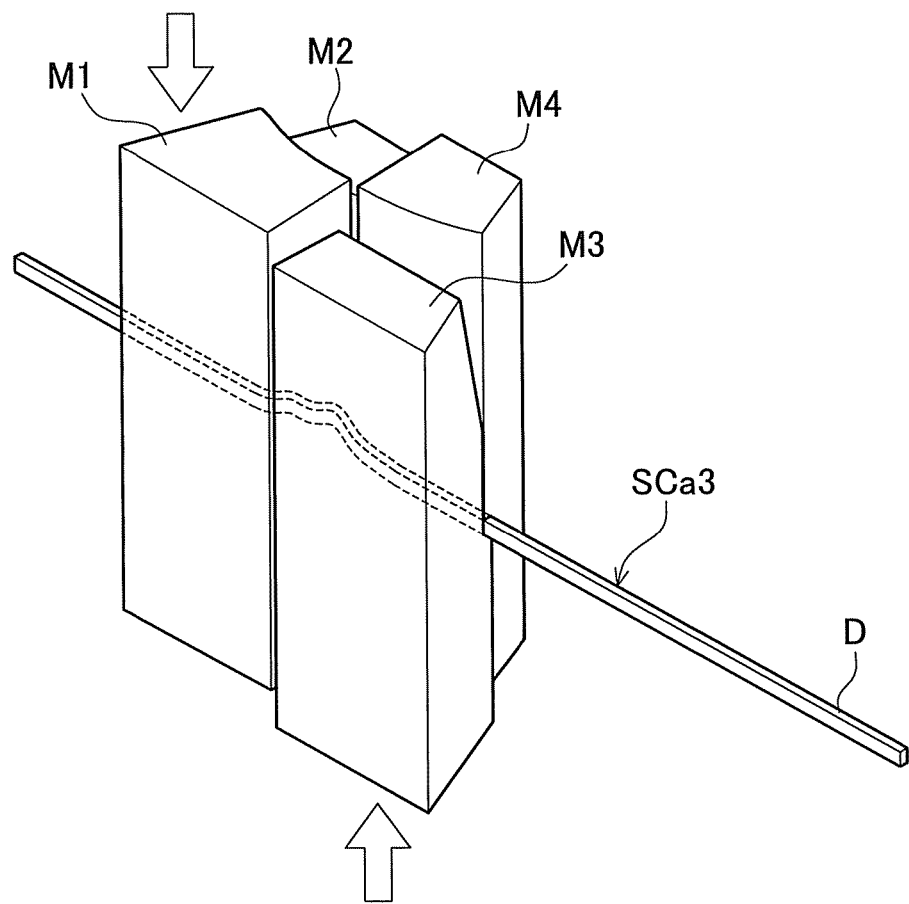
FIG. 4 is a perspective view showing a way to form a protrusion section in the flat rectangular conductor by the main part of the segment coil forming device in the embodiment.

FIG. 2 is a perspective view showing a way to form the circular-arc section Sa1 in the flat rectangular conductor D by the main part 10 of the segment coil forming device. FIG. 3 is a perspective view showing a way to form the crank section S4 in the flat rectangular conductor D by the main part 10 of the segment coil forming device. FIG. 4 is a perspective view showing a way to form the protrusion section S5 in the flat rectangular conductor D by the main part 10 of the segment coil forming device. FIG. 5 is a perspective view showing a way to form the shoulder sections S6 in the flat rectangular conductor D by the main part 10 of the segment coil forming device. For convenience of explanation, as in FIG. 1, FIGS. 2 to 5 do not disclose the drive part.

Figure 17A:
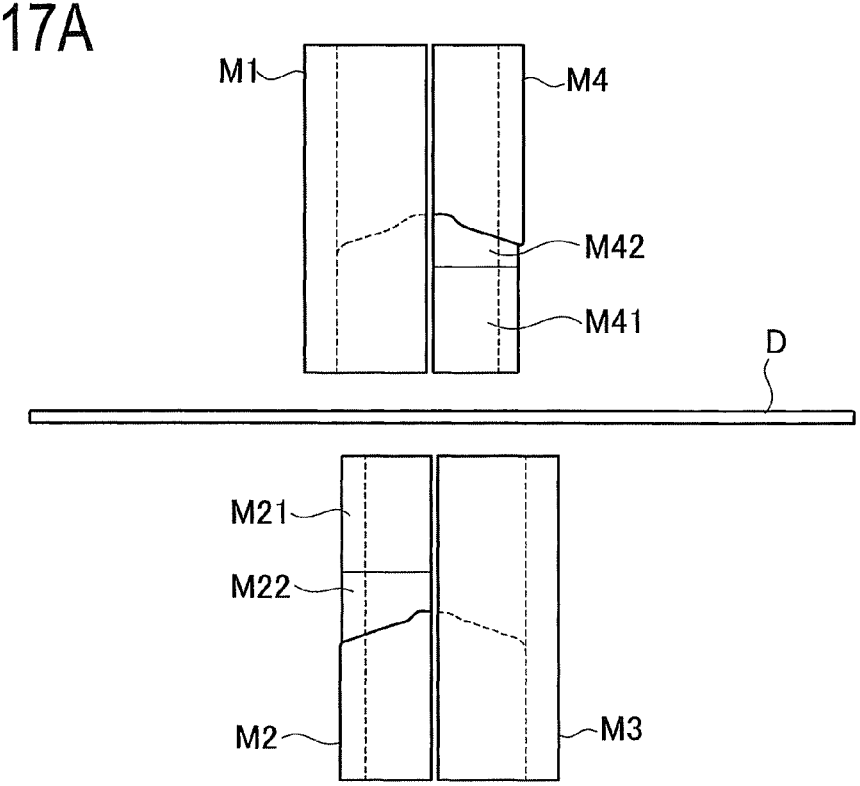
FIG. 17A is a front view of the main part of the segment coil forming device in the embodiment.
Figure 17B:
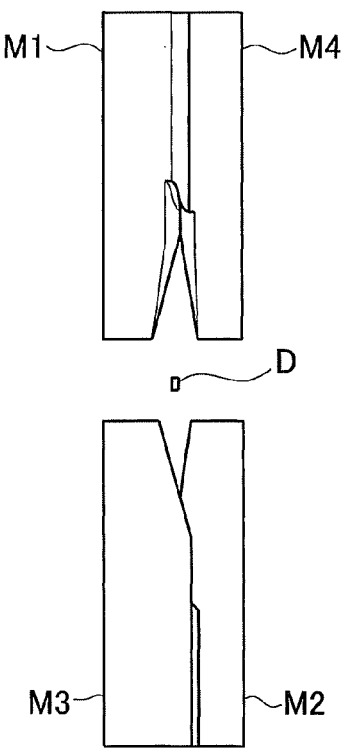
FIG. 17B is a side view of the main part of the segment coil forming device in the embodiment.
Figure 18:
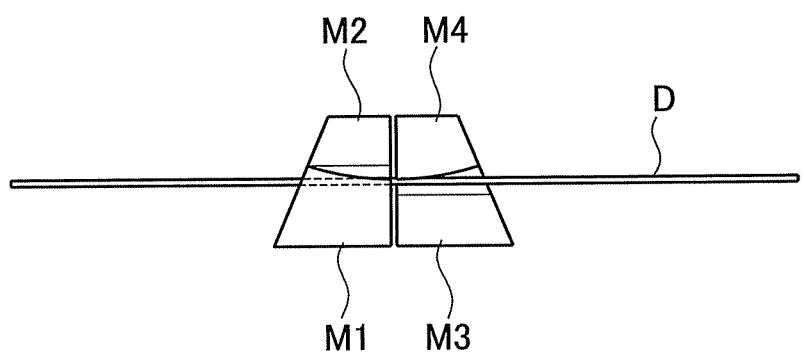
FIG. 18 is a top view of the main part of the segment coil forming device in the embodiment.
Figure 19A:
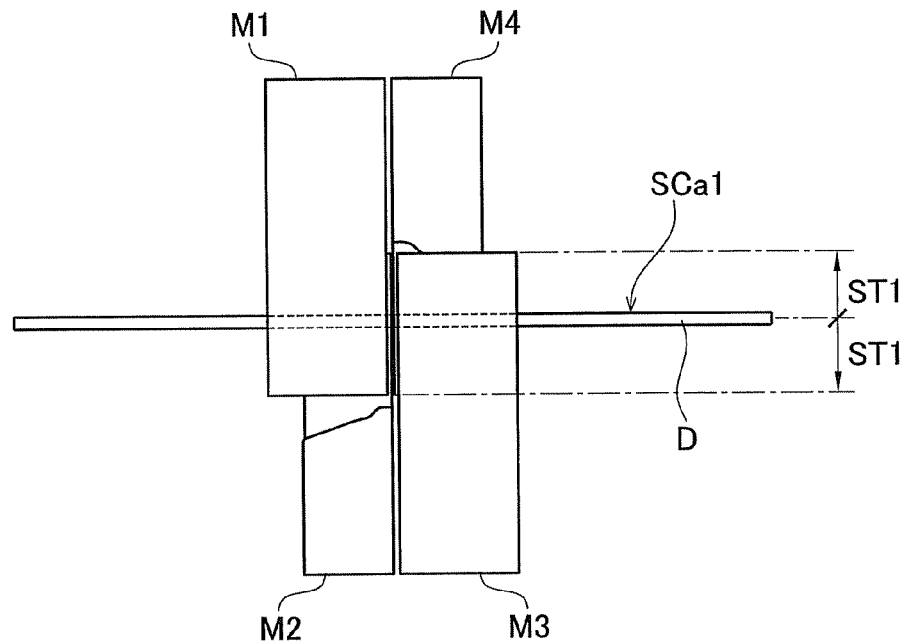
FIG. 19A is a front view showing a way to form the circular-arc section in the flat rectangular conductor by the main part of the segment coil forming device in the embodiment.
Figure 19B:
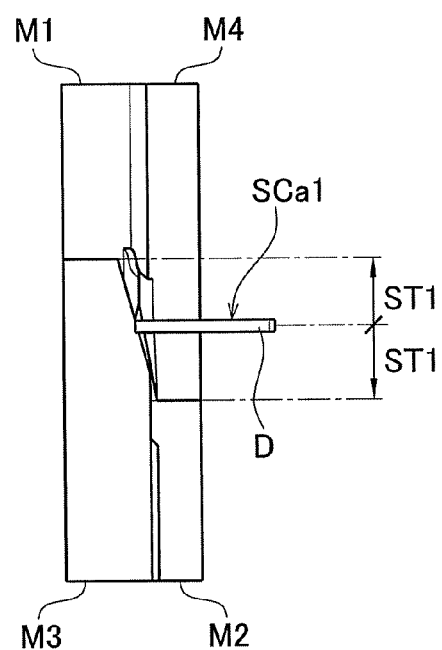
FIG. 19B is a side view showing the way to form the circular-arc section in the flat rectangular conductor by the main part of the segment coil forming device in the embodiment.
Figure 20A:
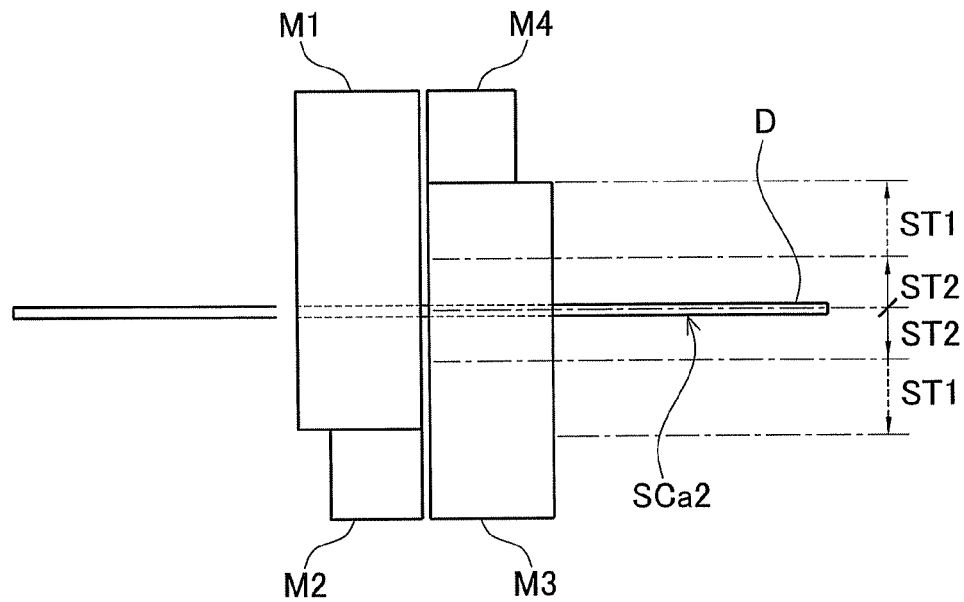
FIG. 20A is a front view showing a way to form the crank section in the flat rectangular conductor by the main part of the segment coil forming device in the embodiment.
Figure 20B:
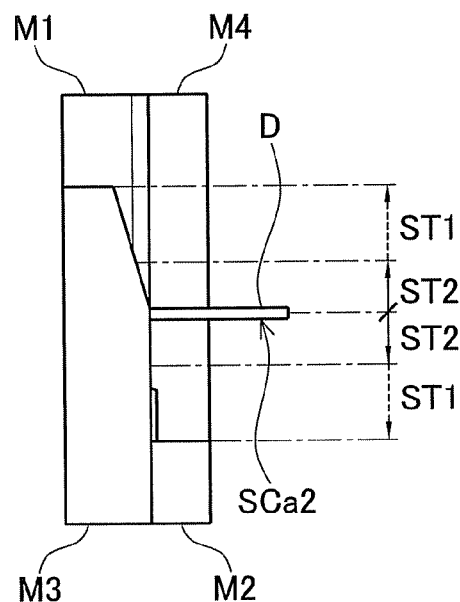
FIG. 20B is a side view showing the way to form the crank section in the flat rectangular conductor by the main part of the segment coil forming device in the embodiment.

FIG. 17A is a front view of the main part 10 of the segment coil forming device. FIG. 17B is a side view of the main part 10 of the segment coil forming device corresponding to FIG. 1. FIG. 18 is a top vie of the main part 10 of the segment coil forming device corresponding to FIGS. 1 and 17. FIG. 19A is a front view showing a way to form the circular-arc section Sa1 in the flat rectangular conductor D by the main part 10 of the segment coil forming device. FIG. 19B is a side view showing the way to form the circular-arc section Sa1 in the flat rectangular conductor D by the main part 10 of the segment coil forming device. FIG. 20A is a front view showing a way to form the crank section S4 in the flat rectangular conductor D by the main part 10 of the segment coil forming device. FIG. 20B is a side view showing the way to form the crank section S4 in the flat rectangular conductor D by the main part 10 of the segment coil forming device.

Figure 21A:
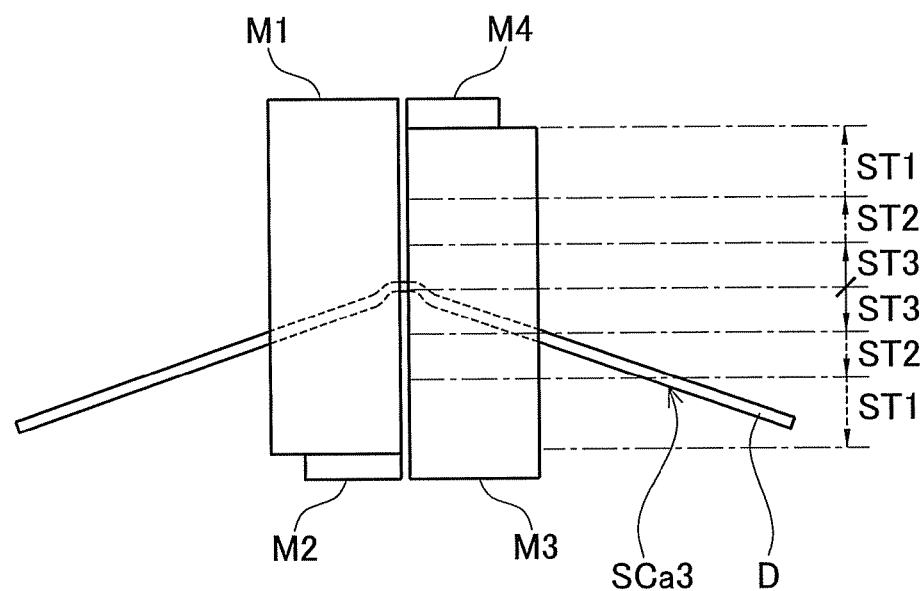
FIG. 21A is a front view showing a way to form the protrusion section in the flat rectangular conductor by the main part of the segment coil forming device in the embodiment.
Figure 21B:
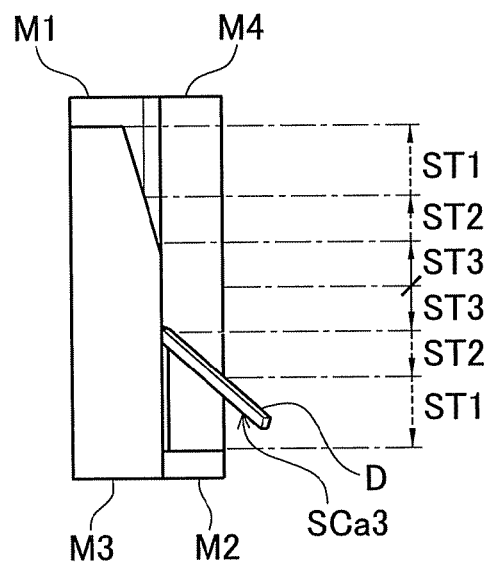
FIG. 21B is a side view showing the way to form the protrusion section in the flat rectangular conductor by the main part of the segment coil forming device in the embodiment.

FIG. 21A is a front view showing a way to form the protrusion section S5 in the flat rectangular conductor D by the main part 10 of the segment coil forming device. FIG. 21B is a side view showing the way to form the protrusion section S5 in the flat rectangular conductor D by the main part 10 of the segment coil forming device. FIG. 22A is a front view showing a way to form the shoulder sections S6 in the flat rectangular conductor D by the main part 10 of the segment coil forming device. FIG. 22B is a side view showing the way to form the shoulder sections S6 in the flat rectangular conductor D by the main part 10 of the segment coil forming device. FIG. 23A is a front view of the shoulder forming die M5 to form the shoulder sections S6. FIG. 23B is a side view of the shoulder forming die M5 to form the shoulder sections S6.

To form the segment coil SC, as shown in FIGS. 1, 17A, and 17B, a forming process is started in a state where the outer peripheral surface forming upper die M1 and the inner peripheral surface forming upper die M4 are disposed above the flat rectangular conductor D both ends of which are held by the holding mechanism 15 shown in FIG. 1 and the inner peripheral surface forming lower die M2 and the outer peripheral surface forming lower die M3 are disposed below the flat rectangular conductor D. To be concrete, the outer peripheral surface forming upper die M1 and the inner peripheral surface forming upper die M4 are moved downward along the Z axis in FIG. 1, while the inner peripheral surface forming lower die M2 and the outer peripheral surface forming lower die M3 are moved upward along the Z axis in FIG. 1.

Subsequently, as shown in FIGS. 2, 19A, and 19B, when the outer peripheral surface forming upper die M1, inner peripheral surface forming lower die M2, outer peripheral surface forming lower die M3, and inner peripheral surface forming upper die M4 are moved by a stroke ST1, the flat rectangular conductor D is formed into the circular-arc section formed body SCa1. Specifically, the flat rectangular conductor D is bent in the flatwise direction along the curved faces M11, M21, M31, and M41 that are respectively provided in the outer peripheral surface forming upper die M1, inner peripheral surface forming lower die M2, outer peripheral surface forming lower die M3, and inner peripheral surface forming upper die M4, as continuously changing curved surfaces, thereby forming the circular-arc section Sa1 in the flat rectangular conductor D.

When the outer peripheral surface forming upper die M1, inner peripheral surface forming lower die M2, outer peripheral surface forming lower die M3, and inner peripheral surface forming upper die M4 are moved by a stroke ST2 as shown in FIGS. 3, 20A and 20B, the crank section S4 is formed in the flat rectangular conductor D. Specifically, the center position of a circular arc defined by the circular-arc face M32 of the outer peripheral surface forming lower die M3 and the circular-arc face M42 of the inner peripheral surface forming upper die M4 is displaced from a circular arc defined by the circular-arc face M12 of the outer peripheral surface forming upper die M1 and the circular-arc face M22 of the inner peripheral surface forming lower die M2, thereby forming the crank section S4 around the center of the circular-arc section Sa1.

Subsequently, when the outer peripheral surface forming upper die M1, inner peripheral surface forming lower die M2, outer peripheral surface forming lower die M3, and inner peripheral surface forming upper die M4 are moved by a stroke ST3 as shown in FIGS. 4, 21A, and 21B, the protrusion section S5 is formed in the flat rectangular conductor D. Specifically, when the outer peripheral surface forming upper die M1 and the inner peripheral surface forming upper die M4 are moved from above in FIG. 4 and the inner peripheral surface forming lower die M2 and the outer peripheral surface forming lower die M3 are moved from below in FIG. 4 so that they come close to each other, the flat rectangular conductor D is applied with a force acting in the edgewise direction by the space defined by the end faces M13, M23, M33, and M43 respectively provided in the outer peripheral surface forming upper die M1, inner peripheral surface forming lower die M2, outer peripheral surface forming lower die M3, and inner peripheral surface forming upper die M4. Thereby, the flat rectangular conductor D is edgewise bent to form the protrusion section S5.

The shoulder formed body SCa4 is formed by the shoulder forming dies M5 placed on both sides of the main part 10 and moved along the main part 10 as shown in FIGS. 5, 22A, and 22B to form the shoulder sections S6 of the segment coil SC. To be concrete, as shown in FIG. 22A or 22B, while the protrusion formed body SCa3 is being held by the outer peripheral surface forming upper die M1, inner peripheral surface forming lower die M2, outer peripheral surface forming lower die M3, and inner peripheral surface forming upper die M4, the shoulder forming dies M5 shown in FIGS. 23A and 23B are moved downward in the figures along the main part 10 to edgewise bend parts of the flat rectangular conductor D protruding from the outer peripheral surface forming upper die M1, inner peripheral surface forming lower die M2, outer peripheral surface forming lower die M3, and inner peripheral surface forming upper die M4 to form the shoulder sections S6 in the protrusion formed body SCa3.

Lastly, by use of the shift-section forming device 20 shown in FIGS. 24 to 28, the slot-section shifts S7 are formed in the shoulder formed body SCa4. To be concrete, while the shoulder formed body SCa4 not illustrated is held by the main part 10 as shown in FIG. 25, the shift-section forming device 20 is moved forward. The roller guides M65a of the shift-section forming device 20 come to contact with the slant surfaces M63a of the stoppers M63 as shown in FIG. 26, and the outside dies M61 are moved inward to the shift-section forming device 20 as shown in FIG. 27. When the shift-section forming device 20 is then further advanced, the outside-die holding members M65 come approach to the back-side die M62 as shown in FIG. 28. Consequently, the front-side die faces M64a of the front-side dies M64 held by the outside-die holding members M65 and the back-side die face M62a of the back-side die M62 clamp and press the shoulder formed body SCa4 to form the slot-section shifts S7.

In the above manner, the segment coil SC is formed by use of the main part 10 of the segment coil forming device and the shift-section forming device 20. For example, by replacing the outer peripheral surface forming upper die M1, inner peripheral surface forming lower die M2, outer peripheral surface forming lower die M3, and inner peripheral surface forming upper die M4 of the main part 10 with other dies and replacing the back-side die M62 and the front-side dies M64 of the shift-section forming device 20 with other dies, a plurality of types of segment coils SC can be formed. Accordingly, the tooling change enables production of every segment coil SC to be used in a stator core not shown.

The method for manufacturing the segment coil in the present embodiment configured as above can provide the following operations and effects.

Regarding the steps of manufacturing the segment coil SC, for example, the number of steps can be reduced and the lead time can be shortened. The present embodiment provides the segment coil manufacturing method for manufacturing the segment coil SC including the circular-arc section Sa1, crank section S4, and protrusion section S5 by winding the flat rectangular conductor D and using the forming dies. The forming dies include the outer peripheral surface forming upper die M1, inner peripheral surface forming upper die M4, inner peripheral surface forming lower die M2, and outer peripheral surface forming lower die M3, and are arranged to form the circular-arc section Sa1, the crank section S4, and the protrusion section S5 while clamping at least two surfaces of the outer surfaces of the flat rectangular conductor D.

When the outer peripheral surface forming upper die M1, inner peripheral surface forming lower die M2, outer peripheral surface forming lower die M3, and inner peripheral surface forming upper die M4 are moved in the Z axis direction in FIG. 1 while the flat rectangular conductor D is held by the holding mechanism 15 as shown in FIG. 1, the circular-arc section Sa1 and the crank section S4 are formed. To be concrete, the outer peripheral surface forming upper die M1, inner peripheral surface forming lower die M2, outer peripheral surface forming lower die M3, and inner peripheral surface forming upper die M4 are moved by the stroke ST1, forming the circular-arc section Sa1, and then moved by the stroke ST2, forming the crank section S4 around the center of the circular-arc section Sa1. Those dies are further moved by the stroke ST3 to form the protrusion section S5.

Since the circular-arc section Sa1, crank section S4, and protrusion section S5 are continuously formed in the above manner without opening the dies, shortening of the lead time can be achieved as compared with a case where they are formed by use of separate dies and these dies need to be separately opened. This case needs die-clamping and die-opening operations when the shape of the flat rectangular conductor D is to be deformed by use of the forming dies. However, for example, when the circular-arc section Sa1 and the crank section S4 are continuously formed, the number of die opening operations can be reduced by one. This can eliminate the die opening operation and the operation of moving the flat rectangular conductor D between the dies for forming different shapes, contributing to shortening of cycle time. In particular, it takes time to position the flat rectangular conductor D in the forming dies in order to enhance shape accuracy of the segment coil SC. As compared with the case of forming the segment coil SC by use of separate dies, the method for manufacturing the segment coil SC in the present embodiment can achieve shortening of whole process time.

The method for manufacturing the segment coil SC in the present embodiment can also enhance the shape accuracy of the segment coil SC. As mentioned above, the main part 10 of the segment coil manufacturing device can sequentially form the circular-arc section Sa1, crank section S4, and protrusion section S5 of the segment coil SC by using the outer peripheral surface forming upper die M1, inner peripheral surface forming lower die M2, outer peripheral surface forming lower die M3, and inner peripheral surface forming upper die M4 without opening the dies. It is further possible to form the shoulder sections S6 by use of the shoulder forming dies M5 and the slot-section shifts S7 by use of the shift-section forming device 20 while the main part 10 remains closed. Specifically, this method enables forming the segment coil SC from the flat rectangular conductor D without opening the dies once.

Consequently, in processing the flat rectangular conductor D into the segment coil SC, it is unnecessary to move the flat rectangular conductor D between different dies. This does not need to change clamping of the flat rectangular conductor D from a die to another. This makes it possible to enhance the shape accuracy of the segment coil SC. If the flat rectangular conductor D in processing needs to be moved from a die to another, reference positioning has to be performed every time. For this reference, a part of the outer surfaces of the flat rectangular conductor D will be used. However, such a manner could not provide high processing accuracy to a bending work itself of the flat rectangular conductor D and might be influenced by spring back and others. This leads to cumulatively large variations in shape accuracy of the segment coil SC every time the flat rectangular conductor D is moved from a die to another. Using the method for manufacturing the segment coil SC in the present embodiment can prevent such a cumulative deterioration in the shape accuracy.

Furthermore, the applicants have confirmed that the present embodiment could restrain the occurrence of the spring back itself. In the method for manufacturing the segment coil SC in the present embodiment, the outer peripheral surface forming upper die M1, inner peripheral surface forming lower die M2, outer peripheral surface forming lower die M3, and inner peripheral surface forming upper die M4 are respectively provided with the curved faces M11, M21, M31, and M41 and the circular-arc faces M12, M22, M32, and M42 to continuously process the segment coil SC. For instance, spring back is likely to be caused in the circular-arc section Sa1 formed by bending the flat rectangular conductor D in the flatwise direction; however, both surfaces of the flat rectangular conductor D are held by the curved faces M11, M21, M31, and M41 and processed by the continuously changing curved surfaces, i.e., the curved faces M11, M21, M31, and M41 and accordingly processing strain is less likely to be accumulated in a direction opposite the bending direction of the circular-arc section Sa1. Consequently, accumulation of processing strain is small in an elastically deformable region, making it difficult to cause spring back.

Similarly, the crank section S4 and the protrusion section S5 are less likely to cause spring back. Regarding the shoulder sections S6, when the moving distance of the shoulder forming dies M5 is set long, it is possible to further reduce the occurrence of spring back. Because of the reduced influence of spring back as above, the shape accuracy of the segment coil SC can be enhanced. In a case of forming the segment coil SC by using separate dies actually conventionally used, it would be difficult to meet the design request for shape accuracy. To the contrary, it was confirmed that using the method for manufacturing the segment coil SC in the present embodiment could provide the shape accuracy meeting the design request.

Using the holding mechanism 15 can hold the flat rectangular conductor D in an optimum position. This holding mechanism 15 is a holder jig having an open end in the bending direction of the flat rectangular conductor D to hold the flat rectangular conductor D. By using the holding mechanism 15, the flat rectangular conductor D can be held in an intermediate position between the outer peripheral surface forming upper die M1 and the inner peripheral surface forming lower die M2 and an intermediate position between the inner peripheral surface forming upper die M4 and the outer peripheral surface forming lower die M3 as shown in FIG. 1. In this way, the flat rectangular conductor D can be held so that it is appropriately nipped between the curved faces M11, M21, M31, and M41 respectively provided in the outer peripheral surface forming upper die M1, the inner peripheral surface forming lower die M2, the outer peripheral surface forming lower die M3, and the inner peripheral surface forming upper die M4. This can contribute to enhanced shape accuracy of the segment coil SC.

The method for manufacturing the segment coil SC in the present embodiment adopts the configuration to move the outer peripheral surface forming upper die M1, inner peripheral surface forming lower die M2, outer peripheral surface forming lower die M3, and inner peripheral surface forming upper die M4 in the Z direction shown in FIG. 1. The moving distances of those dies M1, M2, M3, and M4 are set to be equal to each other as shown in FIGS. 19, 20, and 21. Thus, the movement of the main part 10 of the segment coil forming device can be addressed by a single moving mechanism. Reduction in the number of moving mechanisms can also reduce a production cost of the segment coil manufacturing device. Since the outer peripheral surface forming upper die M1, inner peripheral surface forming lower die M2, outer peripheral surface forming lower die M3, and inner peripheral surface forming upper die M4 are moved along the Z axis, tooling change of each die can also be easily conducted.

The segment coil manufacturing device in the present embodiment is configured so that the outer peripheral surface forming upper die M1, inner peripheral surface forming lower die M2, outer peripheral surface forming lower die M3, and inner peripheral surface forming upper die M4 are placed in positions to face each other, the outer peripheral surface forming upper die M1 and the inner peripheral surface forming upper die M4 will be moved in the same direction that the dies M1 and M4 come close to the inner peripheral surface forming lower die M2 and the outer peripheral surface forming lower die M3. This movement may also be made by the other dies. Furthermore, the outer peripheral surface forming upper die M1 and the outer peripheral surface forming lower die M3 respectively include the curved face M11 and the curved face M31 which will become a circular-arc shaped section forming face to form the outer periphery of the circular-arc section Sa1 and the circular-arc face M12 and the circular-arc face M32 to form the outer periphery of the crank section S4.

The inner peripheral surface forming lower die M2 and the inner peripheral surface forming upper die M4 respectively include the curved face M21 and M41 to form the inner periphery of the circular-arc section Sa1 and the circular-arc face M22 and the circular-arc face M23 to form the inner periphery of the crank section S4. The outer peripheral surface forming upper die M1 and the inner peripheral surface forming lower die M2 are respectively formed with the circular-arc face M12 and the circular-arc face M22 and the outer peripheral surface forming lower die M3 and the inner peripheral surface forming upper die M4 are respectively formed with the circular-arc face M32 and the circular-arc face M42 so that the centers of the circular-arcs defining the surfaces are different from each other, thereby forming the crank section S4 in the flat rectangular conductor D.

Since the four forming dies are used and configured as above, it is possible to form the segment coil SC with increased design flexibility and thus with high shape accuracy. Accordingly, use of the outer peripheral surface forming upper die M1, inner peripheral surface forming lower die M2, outer peripheral surface forming lower die M3, and inner peripheral surface forming upper die M4 enables holding and processing the flat rectangular conductor D in the optimum position. In addition, those dies M1, M2, M3, and M4 can be designed in simple shapes. This makes it easy to maintain processing accuracy of each surface and therefore contribute to enhancement of the shape accuracy of the segment coil SC. Using the outer peripheral surface forming upper die M1, inner peripheral surface forming lower die M2, outer peripheral surface forming lower die M3, and inner peripheral surface forming upper die M4 results in an increase in the number of dies than in a case of using two dies to form the segment coil SC; however, the surface shape of each die can be simplified as shown in FIGS. 13 to 16 and thus the cost of the dies can be reduced and the maintenance of the dies can be facilitated.

Figure 29:
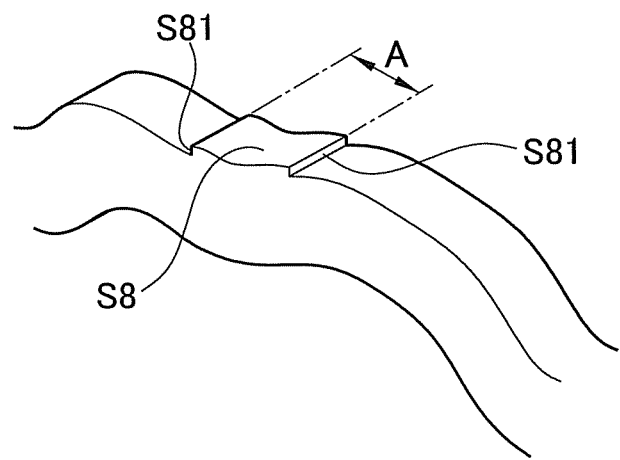
FIG. 29 is an enlarged perspective view of a protrusion section formed in the segment coil in the embodiment.

Furthermore, using the four dies can form reference surfaces S81 in the segment coil SC. In the method for manufacturing the segment coil SC in the present embodiment, the outer peripheral surface forming upper die M1 and the inner peripheral surface forming upper die M4 are respectively provided with the stepped section forming face M15 and the stepped section forming face M45 formed by utilizing a gap between a set of the outer peripheral surface forming upper die M1 and the inner peripheral surface forming lower die M2 and a set of the outer peripheral surface forming lower die M3 and the inner peripheral surface forming upper die M4. FIG. 29 is an enlarge perspective view of a stepped section S8 of the segment coil SC. This stepped section S8 is formed by utilizing a gap A between a set of the dies M1 and M2 and a set of the dies M3 and M4. To be specific, the stepped section forming face M15 is provided in the outer peripheral surface forming upper die M1 and the stepped section forming face M45 is provided in the inner peripheral surface forming upper die M4, thereby forming the stepped section S8 having the same width as the gap A.

The reference surfaces S81 which are side surfaces of this stepped section S8 are formed by the dies and thus can have predetermined surface accuracy. The reference surfaces S81 can be used as a measurement reference of the segment coil SC or a reference in a step of manufacturing a stator not shown.

The invention is explained along the above embodiments, but is not limited thereto. The invention also may be embodied in other specific forms without departing from the essential characteristics thereof.

For instance, the details of the shape of the segment coil SC shown in the present embodiment may be changed within the scope of design matters. The configuration of the main part 10 of the segment coil manufacturing device shown in the present embodiment also may be changed so that the number of dies is two. In a case of using two dies, for example, a fixed die and a movable die are used and configured so that the movable die is moved close to the fixed die. When the movable die is designed to function as the outer peripheral surface forming upper die M1 and the inner peripheral surface forming upper die M4 and the fixed die is designed to function as the inner peripheral surface forming lower die M2 and the outer peripheral surface forming lower die M3, the shape of the segment coil SC can be formed.

The outer peripheral surface forming upper die M1 to the inner peripheral surface forming upper die M4 are moved so that a pair of the outer peripheral surface forming upper die M1 and the inner peripheral surface forming upper die M4 and a pair of the inner peripheral surface forming lower die M2 and the outer peripheral surface forming lower die M3 are separately moved by the drive mechanism. As an alternative, one of the pairs may be fixed. The trapezoidal thread screws are used for the drive mechanism, but another drive method and mechanism may be adopted; for example, separate drive mechanisms may be provided. The flat rectangular conductor D is processed to form the circular-arc section Sa1, crank section S4, and protrusion section S5 in this order by use of the outer peripheral surface forming upper die M1 to the inner peripheral surface forming upper die M4. Even when the order of forming the circular-arc section Sa1 and the crank section S4 is interchanged, the invention is applicable.

REFERENCE SIGNS LIST

10 Main part
15 Holding mechanism
20 Shift-section forming device
30 Fixing member
D Flat rectangular conductor
M1 Outer peripheral surface forming upper die
M11 Curved face
M12 Circular-arc face
M13 End face
M14 Side face
M15 Stepped section forming face
M2 Inner peripheral surface forming lower die
M21 Curved face
M22 Circular-arc face
M23 End face
M3 Outer peripheral surface forming lower die
M31 Curved face
M32 Circular-arc face
M33 End face
M4 Inner peripheral surface forming upper die
M41 Curved face
M42 Circular-arc face
M43 End face
M45 Stepped section forming face
M5 Shoulder forming die
S1 Lead section
S2 In-slot wire section
S3 Inclined section
S4 Crank section
S5 Protrusion section
S6 Shoulder section
S7 Slot-section shift
S8 Stepped section
S81 Reference surface
SC Segment coil
Sa1 Circular-arc section

The invention claimed is:

1. A segment coil manufacturing method for manufacturing a segment coil by bending a flat rectangular conductor by use of a forming die, the segment coil including a circular-arc shaped section, a crank-shaped section, and a protrusion section at a coil end,
the forming die includes a first forming die and a second forming die,
the method includes forming the circular-arc shaped section, the crank-shaped section, and the protrusion section while holding at least two surfaces of outer surfaces of the flat rectangular conductor by the first forming die and the second forming die without opening the first forming die and the second forming die, and
wherein
the method includes holding the flat rectangular conductor by a holding mechanism between the first forming die and the second forming die in a direction intersecting with a moving direction of the first forming die while the first and second forming dies are in a die open state.

2. The method for manufacturing a segment coil according to claim 1, wherein the method includes moving a shoulder forming die along a side face of the forming die to bend the flat rectangular conductor in the edgewise direction.

3. The method for manufacturing a segment coil according to claim 1, wherein
after the circular-arc shaped section and the crank-shaped section are formed in the flat rectangular conductor,
the method includes forming a shift section in a crank shape by bending the flat rectangular conductor in the flatwise direction by a shift section forming die while holding the flat rectangular conductor by the forming die.

4. The method for manufacturing a segment coil according to claim 1, wherein
circular-arc shaped section forming faces to form the circular-arc shaped section and crank-shaped section forming faces to form the crank-shaped section are provided along the moving direction of the first forming die, the method includes:
bending the flat rectangular conductor in a flatwise direction by the circular-arc shaped section forming faces formed in the first forming die and the second forming die to form the circular-arc shaped section, and bending a part of the circular-arc shaped section in the flatwise direction into a crank shape by the crank-shaped section forming faces formed in the first forming die and the second forming die to form the crank-shaped section, and deforming the flat rectangular conductor in an edgewise direction by protrusion section forming faces formed in the first forming die and the second forming die to form the protrusion section.

5. A segment coil manufacturing method for manufacturing a segment coil by bending a flat rectangular conductor by use of a forming die, the segment coil including a circular-arc shaped section, a crank-shaped section, and a protrusion section at a coil end, the forming die includes a first forming die and a second forming die, the method includes forming the circular-arc shaped section, the crank-shaped section, and the protrusion section while holding at least two surfaces of outer surfaces of the flat rectangular conductor by the first forming die and the second forming die without opening the first forming die and the second forming die, wherein circular-arc shaped section forming faces to form the circular-arc shaped section and crank-shaped section forming faces to form the crank-shaped section are provided along the moving direction of the first forming die, the method includes:
bending the flat rectangular conductor in a flatwise direction by the circular-arc shaped section forming faces formed in the first forming die and the second forming die to form the circular-arc shaped section, and bending a part of the circular-arc shaped section in the flatwise direction into a crank shape by the crank-shaped section forming faces formed in the first forming die and the second forming die to form the crank-shaped section, and deforming the flat rectangular conductor in an edgewise direction by protrusion section forming faces formed in the first forming die and the second forming die to form the protrusion section.

6. The method for manufacturing a segment coil according to claim 5, wherein the forming die further include a third forming die and a fourth forming die, the first forming die, the second forming die, the third forming die, and the fourth forming die are placed in positions facing each other, the method includes moving a set of the first forming die and the fourth forming die and a set of the second forming die and the third forming die in a direction coming close to each other to form an outer periphery of the circular-arc shaped section by the circular-arc shaped section forming faces of the first forming die and the third forming die and an inner periphery of the circular-arc shaped section by the circular-arc shaped section forming faces of the second forming die and the fourth forming die, to form the crank-shaped section in the flat rectangular conductor by the crank-shaped section forming faces of the first forming die and the second forming die and the crank-shaped section forming faces of the third forming die and the fourth forming die, the crank-shaped section forming faces being provided so that centers of circular-arcs defining the crank-shaped section forming faces are different from each other, and to form an outer surface of the protrusion section by the protrusion section forming faces of the first forming die and the fourth forming die and an inner surface of the protrusion section is formed by the protrusion section forming faces of the second forming die and the third forming die.

7. A segment coil manufacturing method for manufacturing a segment coil by bending a flat rectangular conductor by use of a forming die, the segment coil including a circular-arc shaped section, a crank-shaped section, and a protrusion section at a coil end, the forming die includes a first forming die and a second forming die, the method includes forming the circular-arc shaped section, the crank-shaped section, and the protrusion section while holding at least two surfaces of outer surfaces of the flat rectangular conductor by the first forming die and the second forming die without opening the first forming die and the second forming die, wherein the forming die further include a third forming die and a fourth forming die, the first forming die, the second forming die, the third forming die, and the fourth forming die are placed in positions facing each other, the method includes moving a set of the first forming die, and the fourth forming die and a set of the second forming die and the third forming die in a direction coming close to each other to form an outer periphery of the circular-arc shaped section by the circular-arc shaped section forming faces of the first forming die and the third forming die and an inner periphery of the circular-arc shaped section by a circular-arc shaped section forming faces of the second forming die and the fourth forming die, to form the crank-shaped section in the flat rectangular conductor by the crank-shaped section forming faces of the first forming die and the second forming die and the crank-shaped section forming faces of the third forming die and the fourth forming die, the crank-shaped section forming faces being provided so that centers of circular-arcs defining the crank-shaped section forming faces are different from each other, and to form an outer surface of the protrusion section by the protrusion section forming faces of the first forming die and the fourth forming die and an inner surface of the protrusion section is formed by the protrusion section forming faces of the second forming die and the third forming die.

8. The method for manufacturing a segment coil according to claim 7, wherein the method includes forming a stepped section in the segment coil at the coil end by stepped section forming faces formed in the first forming die and the fourth forming die or in the second forming die and the third forming die by utilizing a gap provided between a set of the first forming die and the second forming die and a set of the third forming die and the fourth forming die.

9. The method for manufacturing a segment coil according to claim 7, wherein the method includes moving a shoulder forming die along a side face of the forming die to bend the flat rectangular conductor in the edgewise direction.

10. A segment coil manufacturing device including a forming die arranged to bend a flat rectangular conductor to form a circular-arc shaped section, a crank-shaped section, and a protrusion section in a segment coil,
the forming die include a first forming die and a second forming die,
the first forming die and the second forming die have circular-arc shaped section forming faces, crank-shaped section forming faces, and protrusion section forming faces to continuously form the circular-arc shaped section, the crank-shaped section, and the protrusion section without opening the first forming die and the second forming die while holding at least two surfaces of outer surfaces of the flat rectangular conductor, and
further including a holding mechanism placed between the first forming die and the second forming die and configured to hold the flat rectangular conductor in a direction intersecting with a moving direction of the first forming die while the first forming die and the second forming die are in a die open state.

11. The segment coil manufacturing device according to claim 10, wherein
the forming die further include a third forming die and a fourth forming die,
the first forming die, the second forming die, the third forming die, and the fourth forming die are placed in positions facing each other,
the first forming die and the fourth forming die are moved in the same direction, and the second forming die and the third forming die are moved in a direction to come close to the first forming die and the fourth forming die,
the first forming die and the third forming die include the circular-arc shaped section forming faces to form an outer periphery of the circular-arc shaped section and the crank-shaped section forming faces to form an outer periphery of the crank-shaped section,
the second forming die and the fourth forming die include the circular-arc shaped section forming faces to form an inner periphery of the circular-arc shaped section and the crank-shaped section forming faces to form an inner periphery of the crank-shaped section,
the first forming die and the fourth forming die include the protrusion section forming faces to form an outer surface of the protrusion section,
the second forming die and the third forming die include the protrusion section forming faces to form an inner surface of the protrusion section, and
the crank-shaped section forming faces are provided in the first forming die to the fourth forming die so that the crank-shaped section forming faces of the first forming die and the second forming die and the crank-shaped section forming faces of the third forming die and the fourth forming die are different in centers of circular-arcs defining the crank-shaped section forming faces from each other.

12. The segment coil manufacturing device according to claim 11, wherein
stepped section forming faces are formed in the first forming die and the fourth forming die or in the second forming die and the third forming die by utilizing a gap between a set of the first forming die and the second forming die and a set of the third faulting die and the fourth forming die.

13. The segment coil manufacturing device according to claim 11, further including a shoulder forming die configured to move along a side face of the forming die and bend the flat rectangular conductor in the edgewise direction.

14. The segment coil manufacturing device according to claim 10, further including a shoulder forming die configured to move along a side face of the forming die and bend the flat rectangular conductor in the edgewise direction.

15. The segment coil manufacturing device according to claim 10, further including a shift-section forming die to form a shift section in a crank shape by bending the flat rectangular conductor in the flatwise direction while the flat rectangular conductor is held by the forming die.

16. The segment coil manufacturing device according to claim 10, wherein
the circular-arc shaped section forming faces are curved faces to form the circular-arc shaped section by bending the flat rectangular conductor in a flatwise direction,
the crank-shaped section forming faces are curved faces to form the crank-shaped section by bending a part of the circular-arc shaped section in the flatwise direction into a crank shape,
the protrusion section forming faces are curved faces to form the protrusion section by deforming the flat rectangular conductor in an edgewise direction, and
the circular-arc shaped section forming faces and the crank-shaped section forming faces are provided along the moving direction of the first forming die and the edgewise direction of the flat rectangular conductor.

* * * * *

UNITED STATES PATENT AND TRADEMARK OFFICE
CERTIFICATE OF CORRECTION

PATENT NO. : 9,613,750 B2
APPLICATION NO. : 14/346409
DATED : April 4, 2017
INVENTOR(S) : Atsushi Watanabe et al.

Page 1 of 1

It is certified that error appears in the above-identified patent and that said Letters Patent is hereby corrected as shown below:

In the Specification

At Column 14, Line 54, change from "M22, an end" to "M22, and an end"

In the Claims

At Column 28, Line 19, change from "the third faulting die" to "the third forming die"

Signed and Sealed this
Thirty-first Day of July, 2018

Andrei Iancu
*Director of the United States Patent and Trademark Office*